United States Patent
Arnoux et al.

(12)
(10) Patent No.: US 6,553,355 B1
(45) Date of Patent: Apr. 22, 2003

(54) AUTOPOIETIC NETWORK SYSTEM ENDOWED WITH DISTRIBUTED ARTIFICIAL INTELLIGENCE FOR THE SUPPLY OF HIGH VOLUME HIGH-SPEED MULTIMEDIA TELESTHESIA TELEMETRY, TELEKINESIS, TELEPRESENCE, TELEMANAGEMENT, TELECOMMUNICATIONS, AND DATA PROCESSING SERVICES

(75) Inventors: Louis Auguste Arnoux, Christchurch (NZ); Andrew Drummond McGregor, Christchurch (NZ)

(73) Assignee: Indranet Technologies Limited, Christchurch (NZ)

( * ) Notice: Subject to any disclaimer, the term of this patent is extended or adjusted under 35 U.S.C. 154(b) by 0 days.

(21) Appl. No.: 09/134,074

(22) Filed: Aug. 13, 1998

(30) Foreign Application Priority Data

May 29, 1998 (NZ) ............................................... 330544

(51) Int. Cl.[7] .................................................. G06N 5/00

(52) U.S. Cl. ........................................ 706/13; 709/202

(58) Field of Search ............................ 706/13; 709/202

(56) References Cited

U.S. PATENT DOCUMENTS

| | | | |
|---|---|---|---|
| 4,939,726 A | | 7/1990 | Flammer et al. |
| 5,041,044 A | * | 8/1991 | Weinrich .................... 446/130 |
| 5,088,091 A | | 2/1992 | Schroeder et al. |
| 5,115,433 A | | 5/1992 | Baran et al. |
| 5,434,950 A | | 7/1995 | Kallman |
| 5,577,028 A | | 11/1996 | Chugo et al. |
| 5,583,914 A | | 12/1996 | Chang et al. |
| 5,682,382 A | | 10/1997 | Shepard |
| 6,049,819 A | * | 4/2000 | Buckle et al. ............... 709/202 |

OTHER PUBLICATIONS

Goertzel, B., Meaning is a fuzzy web of patterns: semiotics/autonomy feedback in the WebMind Internet AI system, Intelligent Control (ISIC), 1998. Held jointly with IEEE International Symposium on Computational Intelligence in Robotics and Automation (CIR, Jan. 1998.*

(List continued on next page.)

Primary Examiner—Wilbert L. Starks, Jr.
(74) Attorney, Agent, or Firm—Gray Cary Ware & Freidenrich LLP

(57) ABSTRACT

An autopoietic network is described. The network system has distributed artificial intelligence and may be used to supply high volume, high speed, multi media, telesthesia, telemetry, telekinesis, telepresence, telemanagement, telecommunications and data processing services. The invention is implemented by means of a non-hierarchical network having a fractal structure. That is, the system is structured as a network of networks that may individually display self-similar characteristics at all levels of aggregation at which they are considered. The system and its constituent networks are structurally coupled with their environment through hermeneutic processes. These processes are not based on, and do not use, a priori representations of their environment or of the networks themselves. The system includes a number of cybernetic devices which are adapted to function as both the infrastructure of the network and the means by which the network services are delivered to network users. These cybernetic devices communicate with other cybernetic devices in such a manner so that the network is in the form of a fractal, non-hierarchical mesh which is self-similar. The cybernetic devices may be particularly adapted to supervise or "mind" one or more other cybernetic devices functioning at a lower level of aggregation or complexity. The supervised cybernetic devices may be clustered or distributed in space and be associated with machines, systems or people. The functionality provided by the network includes provision of communications for data, voice, videophoney, video-on-demand, entertainment, security, educational services, health care, premises management, energy supply and management, banking and similar purposes.

50 Claims, 17 Drawing Sheets

OTHER PUBLICATIONS

Murthy, K.K., Autopoiesis and strategic management in emerging economies, Innovation in Technology Management—The Key to Global Leadership, PICMET '97: Portland International Conference on Management and Technology, 1997, pp.: 71, Jan. 1997.*

Jinhyoung Lee; Myung Shik Kim, Entanglement teleportation, Lasers and Electro–Optics, 1999. CLEO/Pacific Rim '99. The Pacific Rim Conference on, vol. 3, 1999, pp.: 875 vol. 3, Jan. 1999.*

Ralph, T.C.; Polkinghorne, R.E.S.; Lam, P.K., Characterization of teleportation in optics, Quantum Electronics and Laser Science Conference, 1999. Technical Digest. Summaries of Papers Presented at the, 1999, pp.: 113, Jan. 1999.*

Braunstein, S.L.; Kimble, H.J.; Sorensen, Y.; Furusawa, A.; Georgiades, N.P., Teleportation of continuous quantum variables, Quantum Electronics Conference, 1998. IQEC 98. Technical Digest. Summaries of papers presented at the International, 1998, Pages(s), Jan. 1998.*

Spiller, T.P., Quantum information processing: cryptography, computation, and teleportation, Proceedings of the IEEE vol.: 84 12, Dec. 1996, pp.: 1719–1746, Jan. 1998.*

* cited by examiner

AUTOPOIETIC NETWORK SYSTEM ENDOWED WITH DISTRIBUTED ARTIFICIAL INTELLIGENCE FOR THE SUPPLY OF HIGH VOLUME HIGH-SPEED MULTIMEDIA TELESTHESIA TELEMETRY, TELEKINESIS, TELEPRESENCE, TELEMANAGEMENT, TELECOMMUNICATIONS, AND DATA PROCESSING SERVICES

FIELD OF THE INVENTION

The present invention relates to methods and apparati involving distributed and networked autopoietic artificial intelligence systems with applications in a number of areas, including computing, industrial production, education, entertainment health, and telecommunication. More particularly, although not exclusively, the present invention relates to methods and apparati adapted to create, establish, operate and maintain integrated network systems which provides functionality for distance sensing, action, management and communications operations and activities and referred to as telesthesia (remote sensing, including television), telemetry of remote spaces and devices (remote measurements of physical parameters), telekinesis (remote mechanical action), telepresence (interpersonal audio-visual interaction at distance), telemanagement of remote devices (such as remote operation and control of complex plants, remote management of energy supply and use), and telecommunications (transfer of information of any kind across distances), and enable the provision of related services to third parties. The invention also relates to systems, models and methodologies for use with such systems.

BACKGROUND TO THE INVENTION

Over the last two decades, a number of domains of economic activity related to the use of networks have entered a phase of rapid technological change. These domains include applications requiring the use of networked computers and/or parallel computing, networks of electronic devices of various kinds, and various forms of artificial intelligence and expert systems such as in banking, education, entertainment, health, scientific research, various forms of telecommunications, energy supply and use, water distribution and many facets of local and international commerce and trade.

Changes in these domains are requiring a fast expansion of network throughput capacity, quality of service, such as rates of data transmission and latency, and the range of services capable to be delivered by networked systems. In parallel, there is also a rapidly increasing demand for the supply of services through mobile units (handheld, carried on or by a person such as cellular phone, laptop computer, or installed in a vehicle) that are comparable or equivalent to those provided through fixed units (such as fixed phone devices or desk top computers).

Conventional telecommunications and/or media networks, and related industries, are seeking to respond to the new demands by developing new interactive systems capable of delivering video-phone, video-conferencing, video-on-demand, and Internet services in addition to existing data and voice services. These improvements, however, do not fully meet the emerging new demands. The long term trend is towards the provision of low-cost, high reliability telesthesia, telekinesis, telepresence, telemetry, telemanagement, and telecommunication services based on network systems endowed with distributed artificial intelligence. These services or forms of functionality are closely interrelated. In order to stress this interrelationship, and to facilitate the description of this invention, in the remainder of the text these services are abbreviated as telhex services. This functionality is defined as follows:

Telesthesia—functionality refers to remote sensing, including television in the sense broadcasting audio-visual images and remote collection of audio-visual material. It also includes the other human senses such as touch and smell, albeit in limited forms at present, such as through various so-called virtual reality devices and systems. Beside broadcasting applications in the entertainment industry (such as various forms of television), telesthesia applications include the remote monitoring and surveillance of areas, such as a central business district (CBD) and of premises.

Telemetry—is an extension of telesthesia that refers to the remote carrying out of specific measurements of physical parameters such as temperature, pressure, force, mass, pH, voltage, current, harmonics, digital states, geographical location, and so on. Specific applications include the remote measurement and recording of supply and/or use of energy (power, gas), operating fluids (water, effluents, gases), discrete masses and devices (particles, powders, objects, and so on), monitoring of movements, tracking of vehicles, navigation, and related operations, remote operation of medical and health related devices for remote patient monitoring, remote operation of scientific instruments, and the like.

Telekinesis—refers to remote mechanical action by way of actuating mechanical, electronic, or chemical devices or a combination of these. Specific applications include remote operation of safety and/or health related devices such as railway crossings, traffic lights, health care equipment such as home breathing equipment, remote surgical operations, security of premises and vehicles (like operation and locking of doors), remote operation of machinery in difficult or dangerous environments.

Telepresence—is a further extension of telesthesia, telemetry and telekinesis for personal interactions at distance with other people, objects, devices or animals. Telepresence functionality includes audio and videophony but also extends into uses of a wide range of networked virtual reality techniques and robotics to achieve as comprehensive as might be required a human presence at a distance.

Telemanagement—refers to the remote management of devices or systems such as the remote operation and control of complex plants, the remote management of distributed energy supply and use networks, or the autonomous operation of intelligent networked robotics.

Telecommunications—is understood in the broadest sense to mean the transfer of information of any kind across distances by wired, cabled, or wireless means.

telhex services—also include the integration of part or all of the above forms of functionality such as required for the provision of services to, or by, third parties. These applications, for example, may be limited in scope to specific categories like surveillance and security of premises, provision of multimedia entertainment, or encompass large and complex ranges of networked activities such as in the operation of a hospital, a university campus, an assembly plant, a chemical processing plant, or a whole industrial estate. These activities also encompass the provision of networked administrative consumer services such as banking and insurance, and the facilitation of business transactions of all kinds (from video conferencing to means of electronic payments that preserve full privacy).

Beside the availability of the necessary technology, the development of networked systems endowed with distributed artificial intelligence and telhex functionality is driven by major independent economic and societal change trends. The two main aspects of these trends are: (1) the globalisation of the world economy and its implications for the way economic transactions and information exchanges take place; and (2) related changes in people's social and working life, their lifestyles, work environments, and work practices.

The former of these trends is characterised by the delocalisation of economic transactions. While physical aspects of production, transport, and consumption processes take place at specific geographical locations or routes, the corresponding social, economic and commercial transactions themselves increasingly take place in an informational space that is logically non-local, that is, not geographically located. This non-geographical space is now commonly referred to as "cyberspace". Here social, economic and commercial transactions include orders, purchases, sales, marketing, collection, storage and exchanges of information of all kinds, and in particular production, storage, and exchange of units or amounts of monetary value as in contemporary banking and financial systems, but also new and emerging various forms of electronic cash, creation and handling of legal and commercial instruments (such as contracts, tender documents, bills of lading, and so on), creation and operation of commercial or not-for-profit organisations, and other agencies (such as limited liability companies, co-operatives, associations, incorporated institutions, government agencies, and so on), and engaging in the full range of human social and cultural interactions when these are taking place in a distributed manner beyond ordinary earshot and eyesight.

Such non-local transactions, exchanges or interchanges increasingly take place by networked electronic media rather than face-to-face. Such electronic means, already in existence or under development, are limited in scope and capacity relative to emerging market requirements.

The latter of the trends referred to above is characterised by the rapid destruction of traditional neighbourhoods, work practices and work environments, which until recently provided in rich and varied ways the core facets of people's social life. In the new social and economic environment traditional patterns are fast replaced with personal networks that are geographically distributed over wide areas (such as sprawling suburbs, other cities, other countries). These networks encompass family, friends, work partners and associates, clients, suppliers, competitors, and so on that are specifically geographically located, and, increasingly, non-local organisations and agencies as described above.

These networks are extremely complex, loosely structured and forever changing. At the corporate, national, and international levels, the corresponding infrastructures increasingly require extensive and intensive use of networked telhex services as well as the assistance of artificial intelligence and expert systems (for example, in the cases of the operation of large telecommunications networks, distance education, networked health agencies, transnational or multinational commercial operations, in particular by way of intranets).

The functionality requirements are increasingly defined in terms of self-management, self-routing, and robotics. The overall characteristic of systems meeting such demands is called autopoiesis, meaning literally "self-maker" in the sense of self-creation and self-construction.

In essence, the major contemporary trends referred to earlier require a wide range of electronic networked autopoietic systems to mediate between local and non-local social and economic activities. This mediation is a historically new development that is not well addressed by existing technology or technology currently under development.

Further, the emergent forms of social and economic organisation and ways of doing business increasingly rely on modes of communication that differ profoundly from the dominant modes of organisation found in existing network technology. The latter are still predicated on historical waves of technology development that have traditionally imposed topologies that are characterised by some form of hierarchy, including some central controlling agency, and that incorporate some tree-like structure (see FIG. 1). In contrast, the former rely on loose ever-changing networks that are inherently non-hierarchical, and require various forms of co-operation among local and non-local agencies.

New approaches in the cognitive sciences and related domains of communication, social and economic research are being developed which provide improved understandings of the changes. In particular Varela et al. (*The Embodied Mind, Cognitive Science and Human Experience*, The MIT Press (1992)) have pointed out the convergence between, and the considerable advantages that could be found in integrating, recent developments in the fields of artificial intelligence, networked systems, cybernetics, robotics, and cognitive sciences on the one hand (referred to as cognitive network research in the remainder of this description), and the long-standing epistemological traditions found in Zen, Vajrayana, Madhyamika and Abidharma on the other hand (referred to in summary form as Zen in the remainder of this description).

At the heart of this convergence is a renewed understanding of the fundamentals of communications between people and the structural coupling of cognitive or intelligent networks with their environment. The consequential integration of cognitive network research outcomes and Zen referred to above is carried out in the present invention in the form of a new paradigm that enables the development of non-hierarchical models. In turn this new paradigm serves as the basis for the specification of the apparati and methods described in the present invention that enable the design, production and deployment of non-hierarchical autopoietic networks that are endowed with distributed artificial intelligence, and are able to meet the new demands through telhex functionality. These paradigm, apparati and methods constitute a radical departure from present development trends and stand in marked contrast with current sate of the art.

The latter show a profound inadequacy relative to the new demands resulting in an increasing divergence between the two. In the case of telecommunications, for example, state of the art technology tends to connect end-users through sets of hierarchically organised and layered exchanges that are structured according to tree-like patterns. FIG. 1 describes a path linking subscribers A and B through a typical complex and extensive route tracing back and forth through a series of tree nodes and/or exchanges while A and B are geographically contiguous. Most state of the art technologies do not allow the development of flexible direct routes between A and B.

These considerations apply also to prior art for mobile communications such as cellular phones that are structured as networks of cells. Such systems require an infrastructure of fixed antennas or cellular towers, central agencies or exchanges, and a limited number of interconnect points between competing networks that all impose a strong hierarchical structure on the overall system used to link mobile units as they move from cell to cell. Such systems marginally add mobile functionality to pre-existing hierarchically structured wired or cabled networks. They do not meet telhex functionality requirements of the non-hierarchical networks customers are seeking to develop and use.

As a consequence of the prevalence of hierarchical and tree-based models in prior art, customers and users that are seeking to operate their own networks in co-operative ways that are inherently non-hierarchical and non-local are being forced to use systems and infrastructures that are profoundly hierarchical and increasingly constrained in their capacity, speed and throughput.

Faced with this situation, the response of network developers and service providers has been to keep adding to existing infrastructure and technology by increments without questioning the ongoing adequacy of rationale for prior art. This approach has perpetuated and worsened the problems associated with the hierarchical logic discussed above and has entrenched it instead of mitigating its effects.

Further, current hierarchical and tree-based network models are extremely rigid in their implementation. Nodes cannot be easily physically relocated without substantial costs. Increases in the density of nodes require extensive rewiring, cabling, and laying down of new lines. Overall such systems are capital infrastructure, operation and maintenance cost intensive, in particular, in the form of copper and/or optical fibre cabling, grids of towers and antennas, and layered networks of exchanges. Further, in situations where new networks are being established, such as in numerous developing countries, or where networks need to be re-developed as in previously centrally planned economies, and in areas with difficult terrain wired and/or, cabled systems are often unpractical and/or prohibitive.

Another complementary industry response is to develop multimedia networks with expanded broadband capacities. This is particularly the case in the telecommunications and cable TV industries with bandwidth requirements of at least 100 Mb/s and preferably more than 200 Mb/s. There are two competing approaches: wired and/or cabled, and wireless. The substantially asymmetrical throughput capabilities of broadband systems presently under development is a major disadvantage that is mostly inherited from underlying historical hierarchical structures. Increasingly, network users require to transmit and exchange large amounts of information bidirectionally and in real time with up-links of similar capacity as downlinks, that is, in largely symmetrical ways. The heavy infrastructure costs and, as a general rule, inherent tree-like character of wired or cabled broadband systems are further disadvantages. Because of this, wireless approaches are increasingly preferred, in particular, as noted above, for new developments, re-developments, and in difficult terrain.

However, prior art for wireless systems has been and is being developed in ways that emulate existing wired and cellular systems and therefore exhibit similar underlying hierarchical tree-like topologies such as dense networks of fixed overlapping cells requiring heavy infrastructure investments in towers, antennas, and exchanges.

Because of the above, the major shifts towards increased bandwidth by wired and/or wireless means do not address the emerging market problems and demands outlined above.

Before presenting and discussing the fundamental premises of the present invention, a range of prior art solutions related to the problems described above will now be discussed with a particular focus on telecommunications as such technologies impinge on practically all aspects of the development of large networked systems.

U.S. Pat. No. 5,583,914 (to Chang et al) describes an intelligent wireless signalling overlay for a telecommunication network. The system described is an add-on to an existing wired network and uses a database of locations of the terminations to define the routing used. A particular embodiment of the invention uses GPS devices to provide location data. The database however, is centralised and it is the central routing system that selects voice and data transmission paths. These are optimised according to pre-established criteria. Although the system makes heavy use of wireless links between nodes, the actual structure that implements a given optimised path remains hierarchical and tree-like.

A number of prior art documents implement neural networks for routing packets, (for example see U.S. Pat. No. 5,577,028). In the field of cellular technology, for example, U.S. Pat. No. 5,434,950 describes a method for making hand-over decisions in a radio communication network. The system uses a neural network that mirrors the network of each base station. The neural networks learn hand-over patterns from the actual network. This system is an add-on to existing tree-like systems based on a hierarchy of exchange centres. It does not alter the basic routing protocol and operation of the telecommunications system.

More relevant prior art relating to non-hierarchical network models may be found in satellite technologies such as the Iridium and Teledesic systems. These are intended to provide universal and expanded telecommunications services wirelessly anywhere in the world. Satellite networks operate essentially as relays or bridges over large distances that interconnect users transparently with each other and existing telecommunication systems through gateways.

The Iridium system is controlled by a master control facility whereby each satellite is connected to four others. The overall system includes six orbital levels with eleven operational satellites each. The system is therefore a fixed grid of limited throughput capacity for the direct subscriber to subscriber portion and also functions as a long distance add-on to existing hierarchical telecommunication systems.

The Teledesic system is designed to provide a wireless, fibre-like universal telecommunication services with a capability that extends to video conferencing. The Teledesic system was developed as a global infrastructure, which is intended to allow local service providers to extend their existing networks. It is therefore essentially an add-on, which operates via gateways. The Teledesic system is designed to minimise latency regardless of applications that can tolerate delays such as video-on-demand, versus applications that cannot tolerate such delays such as voice communications.

The Teledesic satellite network is designed to be isolated from terrestrial systems and operates under separate protocols. Thus, it is inherently separate from an end user network environment. Because of the distributed algorithm used independently by each node, this satellite system is described as a non-hierarchical mesh. However, the Teledesic system is, in effect, hierarchical in two ways. Firstly, it involves two layers that are clearly distinct by design and are hierarchically structured with respect to distribution of power and bandwidth capacity. Thus, speed of transmission and routing decisions are also hierarchically structured. Secondly, inside the satellite network itself, there is a logical hierarchy between adjacent communicating satellites and the others.

Further, the Teledesic satellite network system relies on overlapping coverage and on-orbit-spare satellites to maintain satellite system integrity. In this sense, its telecommunications model is comparable to overlapping cell systems developed for terrestrial broadband systems.

Networks of this type are also finite. They are not designed to be added to endlessly with nodes positioned at random locations.

U.S. Pat. No. 5,088,091 (Schroeder et al) describes a High Speed Mesh Controlled Local Area Network. This technique attempts to solve problems encountered in a mesh network with an arbitrary topology (that is, neither linear nor ring networks). These problems include deadlock, handling broadcast messages, network reconfiguration when a node fails and routing messages so that network throughput is higher than that of a single link. As such, Schroeder et al. addresses some of the same problems addressed by the present invention.

However, the proposed solution involves the use of cut-through non-blocking switches connected by series of point to point links with the mesh actually structured as a tree. Any change in the mesh necessitates a complete reconfiguration that recomputes all the legal paths for routing messages through the network. This latter feature appears cumbersome and would severely limit application of the method to large telecommunication networks. The logical tree structure superimposed on the non-hierarchical topology serves to define routing rules for up and down links. For example, packets received downlinks can only be forwarded on downlinks. While such a structure solves the problems addressed by Schroeder et al., it does not fully address the broader problems identified by the present invention such as the seamless integration of mobile units in a non-hierarchical mesh and the development of large meshes. Schroeder et al. limit their invention to, at most, 1408 host computers.

To summarise, prior art relating to non-hierarchical telecommunication systems is generally concerned with improving routing through existing hierarchical networks. Such improvements are generally effected by methods such as overlaying a non-hierarchical trunk line mesh over part of a network for overflow handling; overriding a network hierarchy by using processes at control switch points to define alternative route choices; detecting and mitigating local exchange failure; or overlaying an expert system (such as a neural network) to operate a non-hierarchical part of an international network.

While some methods use a type of dynamic interaction between nodes, the generic approaches are similar to those analysed above in that nodes act like switching automatons using routing tables. The dynamic component is essentially a trial and error system adapted to identify alternative routes in an otherwise hierarchical system. To the applicant's knowledge, all prior art examples correspond to add-ons and are profoundly different from the present invention both in network structure and operating methodologies.

It is also known in the prior art to implement types of artificial intelligence in order to overcome present network limitations and to expand the capabilities of advanced intelligent networks. In particular, a consequence of the hierarchical structure of present networks is that a very large centralised computer package is needed to control them. An example of such a system is that used by British Telecom to manage its network. This system is reported to be approaching its operational limit. The use of software agents and developments in the expanding field of distributed artificial intelligence are being proposed to alleviate the network operating and management problems such as encountered by British Telecom. In this context, an interesting prior art technique, which seeks to overcome these network limitations, does so by the use of software agents called "ants". These approaches mimic, more or less closely, the routing behaviour of real ants. Ants are known to direct traffic flow of fellow ants towards the shortest route towards the food they have found by means of heuristic processes. Ants leave pheromone scent trails wherever they go. Other ants that follow such trails also leave scent. Thus, trails that prove the shortest route are more scented and become the favoured path. The trails of scent constitute a kind of distributed memory of the network status.

Ant software agents are endowed with properties that mimic this behaviour in various ways. British Telecom's ants for example, are hierarchical. A large programme wanders randomly across the network and assesses traffic at each node. At points of congestion, it creates smaller "worker ant" programmes that move to neighbouring nodes to assess routes with spare capacity and update the routing tables at each node accordingly, thus leaving behind them improved routing trails. This approach can however lead to circular routes.

Developments in this area have sought to expand the capabilities of ants both at the local level and at the overall level of network management (such as billing tasks). Related developments have explored the use of genetic algorithms and evolutionary protocols such as implementations of "survival of the fittest" strategies. This is intended to enable ant-software to evolve and develop their capabilities to a point where they can run an entire network autonomously. Major risks and disadvantages in the above approaches include the potential for damaging software at the nodes in the network in ways that cannot easily be corrected, ants evolving the capability to resist attempts at eradicating rogue ants, and ants escaping on a competitor's network.

Similar problems related to topology, telhex services, and the deployment and use of distributed artificial intelligence, are also encountered in numerous other commercial areas, such as computer networks, super-computers and massively parallel machines, energy supply and use networks, networked machinery and processing chains used by a wide variety of manufacturing industries, as well as in the health, education, and entertainment industries.

An inadequate paradigm of subject-object relations and subject-subject communications is found at the heart of the above problems. While this has been known and studied for a long time in the epistemology of Zen, as discussed in detail by Varela et al. (1992) (op. cit.) for example, it is only recently that this issue has started to be recognised in cognitive science and the related fields of Artificial Intelligence, cybernetics and robotics. Yet, up to the present, the implications of the need to adopt a new paradigm in the latter domains, and in the broader field of communications, have not yet been systematically analysed. Based on the following discussion, the present invention offers a new communication paradigm and uses it to specify a set of network and network models, apparati, and a generic method for operating same.

Current and state-of-the-art relating to communications and handling of objects is based on a dual Aristotelian logic that, in its simplest expression, postulates two items, an emitter and a receiver. A relation between the two carries messages from emitter to receiver. This is shown in Schematic 1 where the emitter is E, the receiver R, and the message carrying relation f(m):

Schematic 1

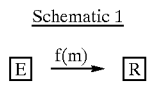

With reference to Teundroup (*L'Immortalité est la Mort des Illusions*, in *Question De*, No. 71, pp 119–138, Paris (1987)), this structure is, in effect, a particular version of the more general subject/object dual postulates as described in Schematic 2:

Schematic 2

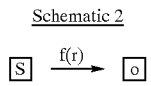

S and O represent respectively any subject and object. The squares emphasise that they are perceived to be fixed in their nature and are independent and distinct from one another. f(r) represents any one-to-one relation between S and o. This structure is generally perceived as a fair representation of how people interact with things and other people around them, and of how, in particular, they communicate. In practice, however, this description can be seen to be, at best, a crude approximation, as is analysed below.

Fr={f(r)$_i$}. Fr thus defines how any S interacts with its environment when it is perceived as distinct from self and composed of separate objects. O may be called the set of such objects, O={o$_i$}. Schematic 3 represents this more general description:

Schematic 3

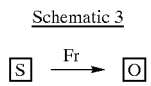

S's awareness of its own existence only occurs by virtue of distinctions from that which it is not. In this perspective, S's awareness of its own existence happens only through Fr. Similarly, for an external observer who abides by the same generic relational logic, the awareness of the existence of S is contingent on Fr-like sets. It effectively follows that S's ego, that is, S's sense of self, is identical with Fr. However, this also means that the existence of the elements of O, that is, the objects in S's environment, is contingent upon S's capture of them through Fr. This dual relationship is more accurately described by Schematic 4 that highlights the reciprocal determination of S and O by each other through Fr:

Schematic 4

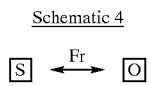

However, this means further that neither S nor O exist by and in themselves independently from one another. They are in some form of correlation with each other, and Fr is better expressed as a correlation function Fc. This can be represented more specifically by Schematic 5:

Schematic 5

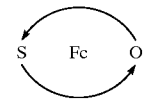

This means that, from a point of view that is independent from S and O, and not predicated on the prior existence of subjects and objects as fixed independent entities, the only existence that can be stated conclusively is that of the operational capability of the correlation function as expressed in Schematic 5:

Schematic 6

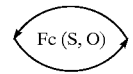

In other words, objects and subjects experienced through such correlations are void of proper existence in and for themselves (notion of vacuity). Those items, the experiences expressed through Fc (S, O), are called "dharmas" in Zen psychology and epistemology. A dharma is the co-arising of both S and the endless series of objects o$_i$ so that the awareness of S, that of O, and of the relations S entertains with O are concomitant and cannot be dissociated. Given the infinite multiplicity of possible sets of objects, and the parallel multiplicity of possible subjects that can be defined in this way, in its most generic form, this awareness is the set $\Phi_c$ of relationship functions of which, in effect, S and O are sub-sets (see Schematic 7):

Schematic 7

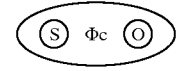

Schematic 6 and Schematic 7 are more accurate characterisations of how people interact with their environment and communicate with each other than Schematic 1 and Schematic 2.

However, prior art in the domains of artificial intelligence and cybernetics has developed in two main directions, symbolic versus connectionist, that both remain predicated on the paradigms expressed in Schematic 1 and Schematic 2. This relates in particular to the use of experts systems using symbolic processing of data, and approaches based on neural networks. It is being increasingly recognised that neither approach on its own can suffice to develop advanced forms of artificial intelligence and be applied reliably to operate large commercial networks (see in particular Minsky, M., 1990, "Logical vs Analogical or Symbolic vs Connectionist or Neat vs Scruffy", in *Artificial Intelligence at MIT, Expanding Frontiers*, Winston, P. H., (Ed.), MIT Press), and above discussion on software ants). A satisfactory integration of the two approaches or alternative route remains to be developed. The difficulty they face is that is neither integrates the above critique of subject/object relations.

Similarly, in the fields of robotics, and software agents, cognitive approaches have sought to structure systems through functional layers that are meant to mimic the human mind or the minds of less developed cognitive systems such as that of insects. Here again two main approaches can be found. Some, like Aaron Sloman (University of Birmingham) have adopted layers defined in terms of operational functions such as perception, central hierarchical systems of reaction, management, and metamanagement, and action sub-systems, while others like Rodney Brooks (MIT's AI Laboratory) have criticised the former and opted for approaches to the development of autopoietic cognisant systems through the definition of layers in terms of activities, such as identifying, monitoring, avoiding, rather than operational functions. Yet neither side has integrated the need to radically alter fundamental paradigms of cognition reflected in the above discussion of subject/object dialectics.

Further, Varela et al. (1992, Op. Cit.) have stressed that both autopoiesis and cognition, in cognitive networked systems like the brain, appear to be emergent properties of massive interconnections amongst networks of distributed systems that are also themselves networks of systems without any apparent hierarchy or centralised controlling system. In other words, autopoiesis and cognition are predicated on the dense dynamic interconnection of numerous simple components that each operate in their own local environment and that are structured as networks of networks where member networks have a degree of autonomy. In this respect, Varela et al. have pointed out the incoherences and contradictions in much of the fields of cognitive science and artificial intelligence that result from failing to draw the full implications of the above considerations regarding cognitive networks. In contrast, they have shown how Abidharma and Zen have developed an extremely refined and coherent epistemology of cognition that matches the empirical findings of modern science and can serve as a starting point to develop more effective approaches that do not fall prey to the pitfalls and difficulties outlined above. Yet, up to the present, the potential of Zen epistemology for the development of autopoietic intelligent networks has not been effectively translated into practice.

It is an object of the present invention to overcome or at least mitigate the disadvantages and problems encountered in prior art and discussed above. It is a further object of the present invention to provide a new paradigm for the development of networked systems, and based on this new paradigm to provide a set of networks and network models, apparati, and a method for operating same that are able to meet the emerging market requirements referred to above. A further object is to emulate how users socially and economically interact with each other through their own informal networks, in particular through face to face interactions, and how they interact with objects and machinery in their immediate environment.

It is a further object of the present invention to provide a method that enables the development and deployment of distributed artificial intelligence in cybernetic networks that operate in symbiosis with human societies and human intelligence in safe, seamless, and flexible ways or to provide the public with a useful choice.

DISCLOSURE OF THE INVENTION

In one aspect the invention provides an autopoietic networked system which mediates local and non-local activities by interacting with the environment in which the activities occur in hermeneutic fashion through iterative heuristic sequences that the system uses to develop satisfactory actions, these actions being actions that satisfy requirements or criteria set by users or designers of the system.

The heuristic sequences are the enactment of distinctions the system makes and extracts out of the background flow of environmental data, said distinctions referring to the process of selecting data as being relevant for specific activities by reference to corresponding set criteria such as by trial and error iterative selection process or any other process that satisfies the set requirements or criteria.

The operation of the system is preferably experiential that is, entirely based on experience.

The system preferably may be self similar at all levels of aggregation at which they are considered so that it displays fractal features and can be characterised as a fractal system, and may be structured as a network of networks that may individually display said self similar characteristics.

The system is preferably non-hierarchical but may exhibit hierarchy in some applications, and works preferably through co-operative interactions among member networks, the co-operative interactions meaning that the components of the system work together to carry out tasks without the interactions themselves being governed by a hierarchical structure.

The system and its member networks, if any, are structurally coupled with their environment through the aforementioned hermeneutic processes wherein they are not based on, and do not use a priori representations of their environment or themselves.

The system and its member networks if any preferably co-develop and evolve with their environment through relationships which arise in a co-dependent manner.

The hereinbefore defined mediation and actions carried out by the system via the aforementioned hermeneutic processes and structural coupling are independent of any a priori data pertaining to, statement regarding, or hypothesis, the users or designers of the system could make about the state and or nature of the system and or its environment.

At each level of aggregation, member networks of said fractal system preferably display operational closure wherein, while the mode of operation of individual components may be that of distributed non-symbolic forms of processing wherein such member systems preferably display operational closure in relation to other members, interactions between member networks preferably occur through symbolic information exchange and processing wherein the overall systems themselves preferably display operational closure in relation to their environments.

The autopoietic system as hereinbefore defined are systems that are endowed with telhex functionality wherein said functionality being defined as any or all of telesthesia, meaning remote sensing, telemetry, meaning remote measurement, telekinesis, meaning remote mechanical action, telepresence, meaning forms of presence effected at a distance and interactions with remote environments and the people, animals and or object they contain through such telepresence, telemanagement, meaning management of people, things, devices and or processes at a distance, and telecommunications meaning any form of transfer of information or data at or over some distance, said telhex functionality being structured and adapted to match the forms of human consciousness that are related to the five senses and more broadly in terms of contact, feeling, discernment, intent, attention, and other such functions as that may be required for and integrated into interpretative cognition, discriminatory consciousness, and storehouse consciousness or memorisation.

The structured telhex functionality of the autopoietic system defines layers of activity that apply at all levels of aggregation of said system and are referred to as layered functionality.

At all the levels of aggregation, the autopoietic system displays a dual structure with at least some of its internal organisation being intimately related to local activities through local apparati, whilst the overall system is non-local in its logic of operation.

Preferably, the system adapts to changes in its environment in a manner which is proscriptive and specifies non-allowed behaviour of the system thus allowing the system to behave in any manner that is not proscribed.

Preferably, the adaptation is performed by selecting solutions that satisfy performance criteria rather than by optimisation routes with respect to set criteria.

In a further aspect the invention provides an autopoietic network system adapted to operate with the telhex functionality, and preferably incorporating distributed artificial intelligence, including:

a plurality of cybernetic devices adapted to function as both the infrastructure of the network and the means by which network services are delivered to network users, wherein said cybernetic devices are particularly adapted to deliver said services to a specific region of space and to communicate with other cybernetic devices in such as manner that the network is in the form of a fractal, non-hierarchical mesh, so that the mesh is self-similar, said mesh having a structure, at a specified degree of aggregation, which is substantially similar to that at any other degree of aggregation at which the fractal mesh is considered.

Preferably, cybernetic devices functioning at a simplest level of aggregation are referred to as assistants and are preferably but not necessarily restricted to a specified region of space, cybernetic devices functioning at a next more complex level of aggregation are referred to as minders, cybernetic devices functioning at a higher level of complexity are referred to as metaminders, and cybernetic devices functioning at yet a higher level of complexity are referred to as hyperminders.

Said cybernetic devices may be adapted to operate in a region of space or in relation to a group of cybernetic devices with which they are associated as well as facilitating communications from and to other cybernetic devices.

Said cybernetic devices may be adapted to supervise or mind one or more other cybernetic devices functioning at a lower level of aggregation or complexity where said supervised cybernetic devices may be clustered or distributed in space, and/or any other type of implements, machines, systems, animal, or person The invention further provides for a cybernetic device including:

hardware adapted to deliver specific telhex functionality to a region of space with which it associated; and communications means adapted to allow communications with other cybernetic devices.

Preferably said telhex functionality includes provision of communications for data, voice, videophony, video-on-demand, entertainment, security, educational, health-care, premises management, energy supply and management, banking and such like purposes.

Preferably the cybernetic devices further include processing and memory means and more preferably location determination means such as GPS or similar.

In an alternative embodiment the cybernetic devices may include input and/or output means including video, audio or the like.

The cybernetic devices may be incorporated into, or connected (wirelessly, wired, or cabled) to ancillary devices such as network computers, inertial or other non-GPS based guidance devices.

In a preferred embodiment, the number of levels of aggregation is not limited.

In alternative embodiments the communication means between cybernetic devices may involve wired, cabled and/or wireless network means.

In a preferred embodiment, the communication means are wireless.

In a preferred embodiment of telecommunication applications the wireless means use LMCS or LMDS radio frequencies (respectively meaning Local Multipoint Communication or Distribution Services or Systems), and typically located in most countries in the 25 GHz to 31 GHz and 42 GHz to 47 GHz ranges.

Preferably the communication devices incorporate electronic circuits which include one or more programmable element, such as a field programmable gate array, a field programmable analog array or a [so-called] dynamically programmable gate array.

The programmable element may be interfaced so as to take as an input a bit stream to be transmitted and produce, as output, the intermediate frequency for the said wireless communication device.

This intermediate frequency may be of the digital or analog types.

The choice of digital or analog intermediate frequency is determined by the evolution scheme used to programme the device as may be required in specific applications.

Preferably the cybernetic devices may be programmed using a technique which may emulate Darwinian evolution by generating large numbers of solutions covering numerous possibilities within preset specifications and then selecting the fittest to serve as the starting point for a new iteration wherein selection processes are continued until a satisfactory outcome has been achieved relative to set operating criteria.

Other iterative programming methods may be used, such as variations on simulated annealing and other stochastic ensemble procedures.

Preferably two types of evolution scheme may be used, wherein the first type selects a suitable modulation scheme, and evolves an implementation wherein a digital intermediate frequency is used, and the transmitter and receiver designs are evolved separately and wherein the second type specifies a communication link model, and evolves a transceiver design that satisfies the design constraints of the model.

Preferably the design constraints may include regulatory constraints such as the bandwidth for the link that is required for specific applications.

Preferably, the evolution scheme will also evolve a modulation scheme.

An analog intermediate frequency may be used.

The evolution scheme proceeds by a series of steps which may be implemented by means such as genetic algorithms, simulated annealing algorithms, backpropagation of errors or other similar iterative procedures.

Such genetic algorithms are preferably of a class known as minimization algorithms and require a measure known as a cost function or error metric to minimize wherein suitable cost functions must include at least the bit error rate, consideration of out of bandwidth spectral components, and speed of transmission.

Preferably the system is left free to evolve compression algorithms that will improve the efficiency of the link.

In a further aspect the invention provides for a method of operating networked systems including the steps of:

establishing a set of basic operational algorithms related to the operation of the network, said algorithms adapted to provide telhex functionality and said algorithms being preferably developed and selected through the proscriptive logic and the method of evolutive satisfaction as hereinbefore described.

Preferably transitory local or non-local software entities are created that reflect the state of the network environment at various or selected levels of aggregation or the task or activities to which the network is to be put.

Preferably said software entities are referred to as dharmas by reference and deference to the Zen epistemological tradition.

The dharmas are aggregated or compiled from the basic set of algorithms through an operational syntax that enables the hereinbefore defined heuristic and hermeneutic sequences, structural coupling, operational closure, telhex functionality and methods of proscriptive logic and evolutive satisfaction.

Preferably the syntax correspond to a set of logical rules that governs the gathering and aggregation of algorithms to create dharmas and that translate, in any computer language capable of implementing the said heuristic and hermeneutic sequences in local and non-local manner, the logical operations of the network.

Preferably, the dharmas are adapted to achieve hereinbefore defined co-operation among member components of said networked system, such members being local cybernetic devices and related networked software, and non-local networked software both local and non-local software being networks of dharmas referred to as metadharmas or Mdharmas.

Preferably the dharmas operate through heuristic hermeneutic sequences.

The dharmas are preferably designed to achieve operational closure of the member networks and overall network, structural coupling of the member networks and overall network with their respective environments, co-operation among member networks, Mdharmas and other cybernetic components, mediation between local and non-local activities, including communications and other telhex functionality, preferably through hereinbefore defined layered functionality.

Preferably said dharmas and Mdharmas are adapted and set to evolve through hereinbefore-defined proscriptive logic and method of evolutive satisfaction.

Preferably the network operates by means of dharma software entities that are created as a result of requesting the network to perform any task; whereby said dharma software entities are comprised of groups of basic operational algorithms and/or are evolutively created by prior such software entities from an original set of such said operational algorithms.

BRIEF DESCRIPTION OF THE DRAWINGS

The present invention will now be described by way of example only and with reference to the drawings in which.

As a preliminary point, the network model developed according to the invention is herein referred to as the IndraNet—a name derived from Zen.

In Zen, and more broadly the Buddhist literature, Indra's net is a fractal structure such that each of its nodes is a jewel that owes its existence to, and reflects, every single other node jewel in the net, while at the same time it co-creates the whole net along with all the other nodes. This net is infinite (that is, it is not finished, not complete, and can always be extended with the addition of further jewel nodes). This metaphor serves as the starting point for the following description of the invention.

This particular epistemological stance stipulates that items in a specific universe do not have any fixed independent existence, entity or essence. Each item co-arises with all the others, is a manifestation and co-creation of the whole, and at once is co-creating the whole along with all other items. In IndraNet this co-arising and creation is achieved through the IndraNet Paradigm.

Figure 1:
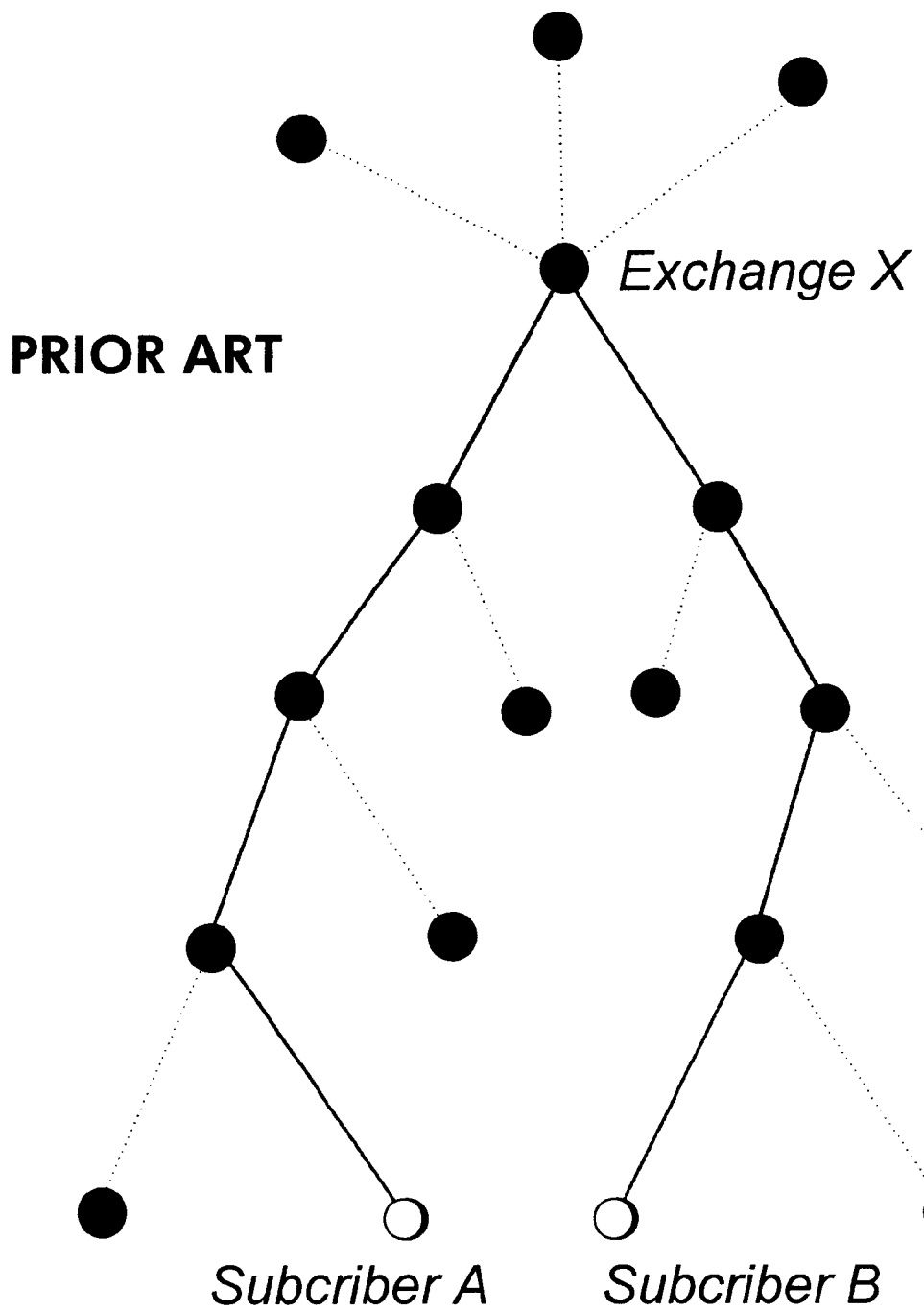
FIG. 1: illustrates a conceptual schematic of a prior art tree-like telecommunication network.
Figure 2:
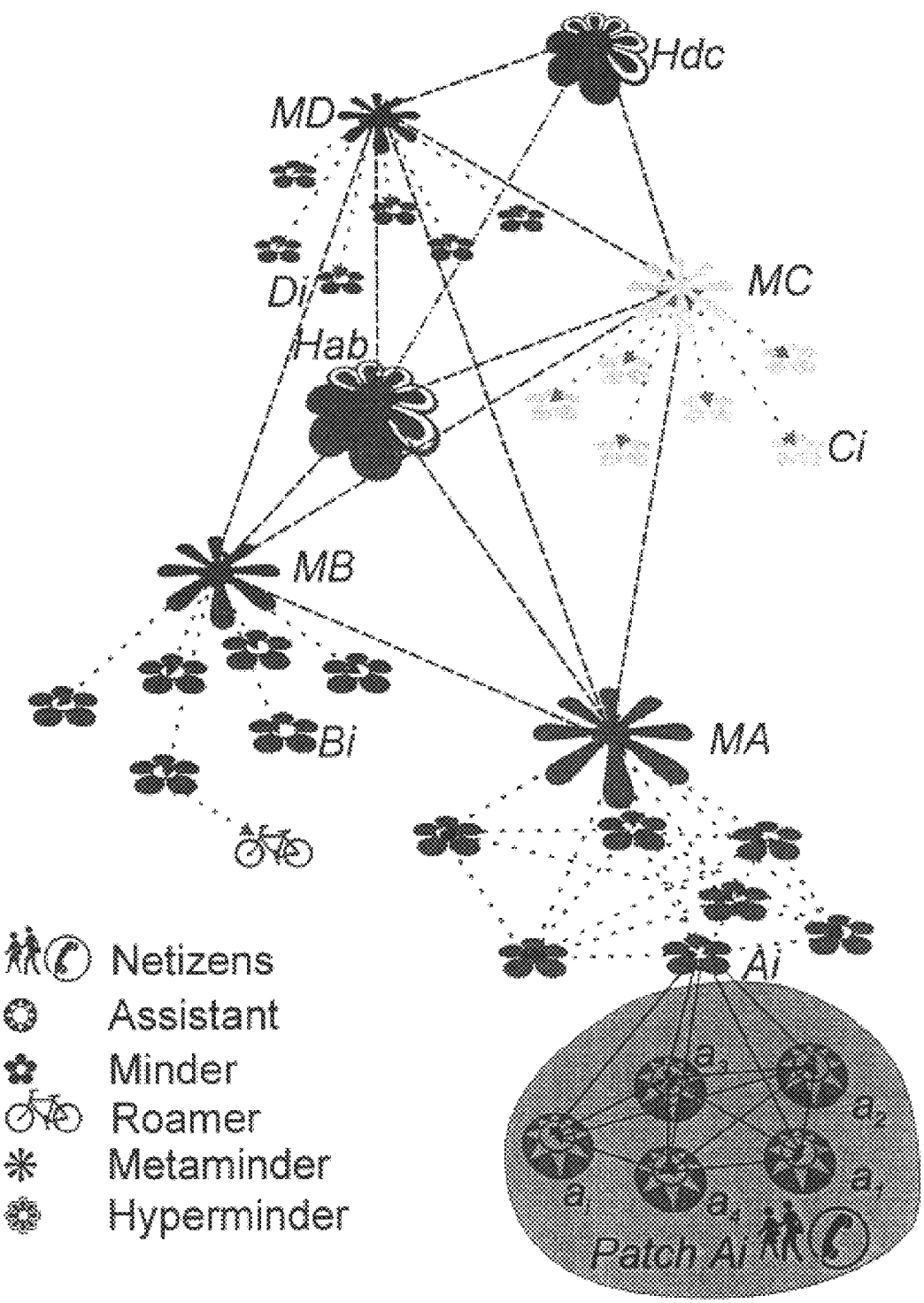
FIG. 2: illustrates the fractal structure of a network according to the present invention.

In describing IndraNet, logical structures and software entities quite different from those currently used in the state of the art will be referred to. Therefore, a specific terminology has been developed to assist in describing the system. This terminology is summarised as follows. With reference to FIG. 2, it is noted that the lines illustrate mesh structure at each level of aggregation, not hierarchical relationships.

Cyberhood: a virtual space encompassed by IndraNet. As noted above, it refers to the non-local IndraNet space "inhabited" and used by IndraNet users to exchange information and provide local and non-local telhex functionality.

Netizens: entities (e.g. humans, organisations, animals, cybernetic systems, machines and like devices) peopling the cyberhood.

IndraNet: a networked infrastructure formed by cybernetic netizens placed at the nodes of the said network, and that mediates local and non-local activities. These activities may be undertaken by people, machines or devices connected to the IndraNet, by Netizens, or by the IndraNet itself.

Minders: cybernetic netizens located at each node of the net. This expression imports the notion of "mindfulness" that is central to the operation of IndraNet. Minders preferably incorporate transceivers. Minders carry out both telecommunications and node specific functions. While carrying out a primary role of communications, minders also function as providers of node specific services based on telhex functionality. For this purpose, and as required for specific applications, minders are endowed with suitable telhex functionality.

Figure 4:
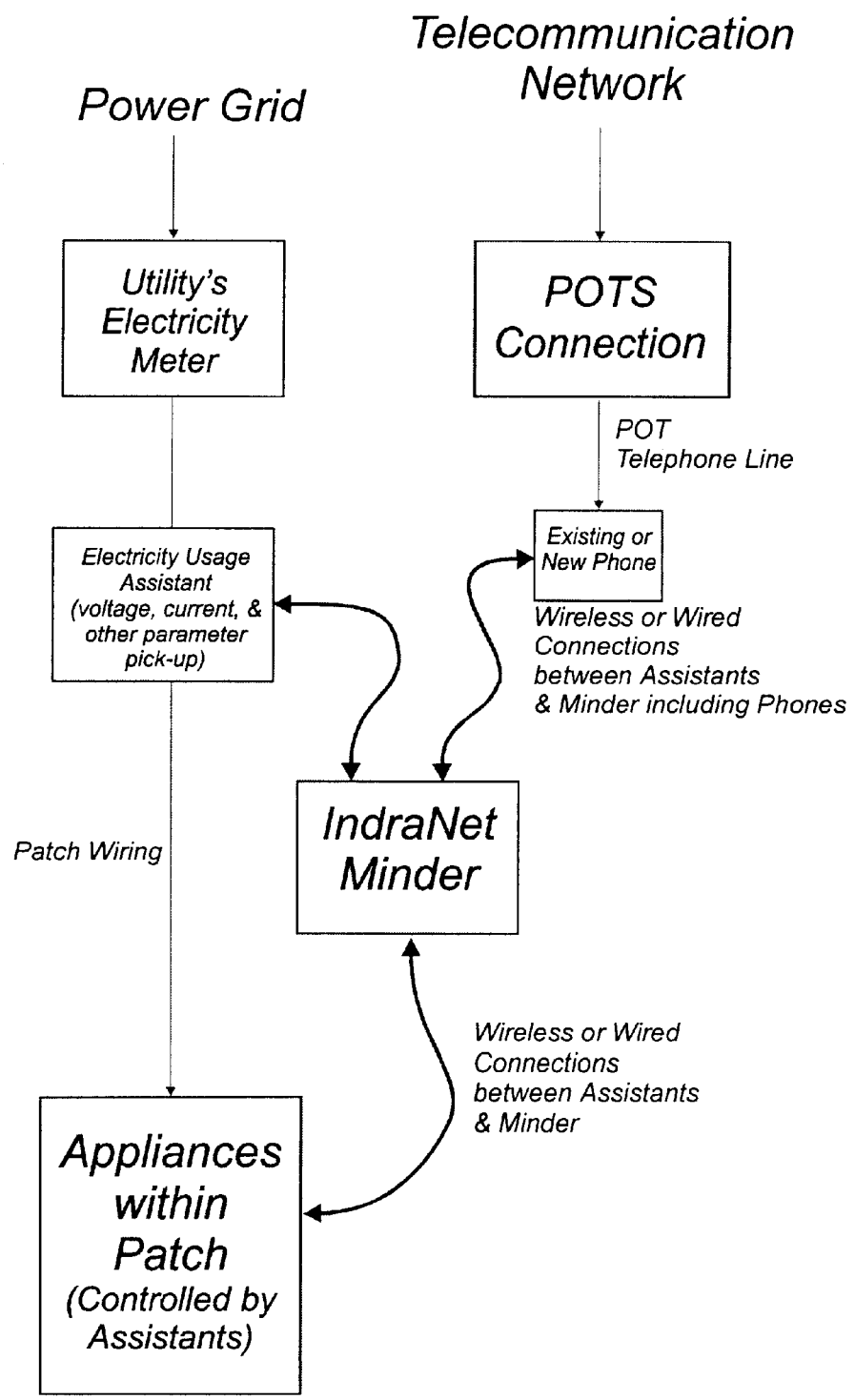
FIG. 4: illustrates the basic positioning of a minder inside physical premises.
Figure 6:
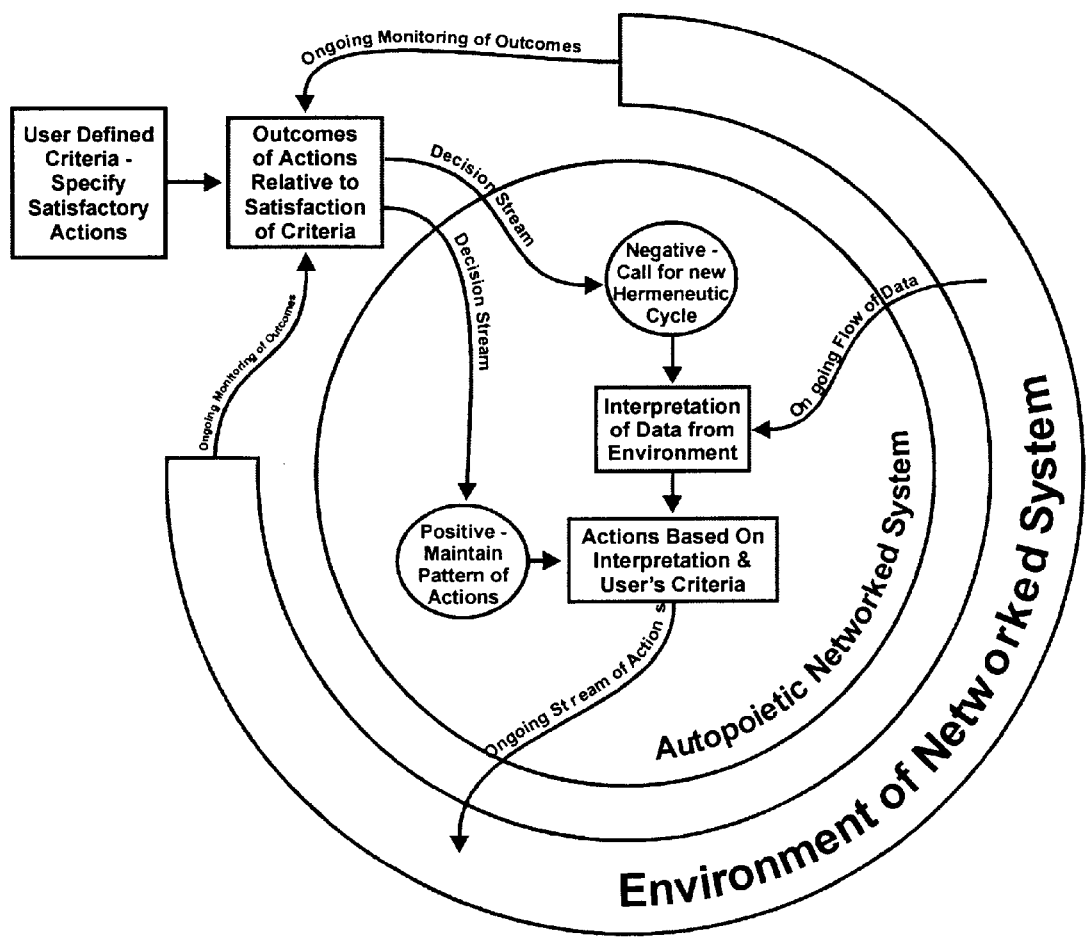
FIG. 6: illustrates the procedural steps involved in the function of an autopoietic networked system.
Figure 7:
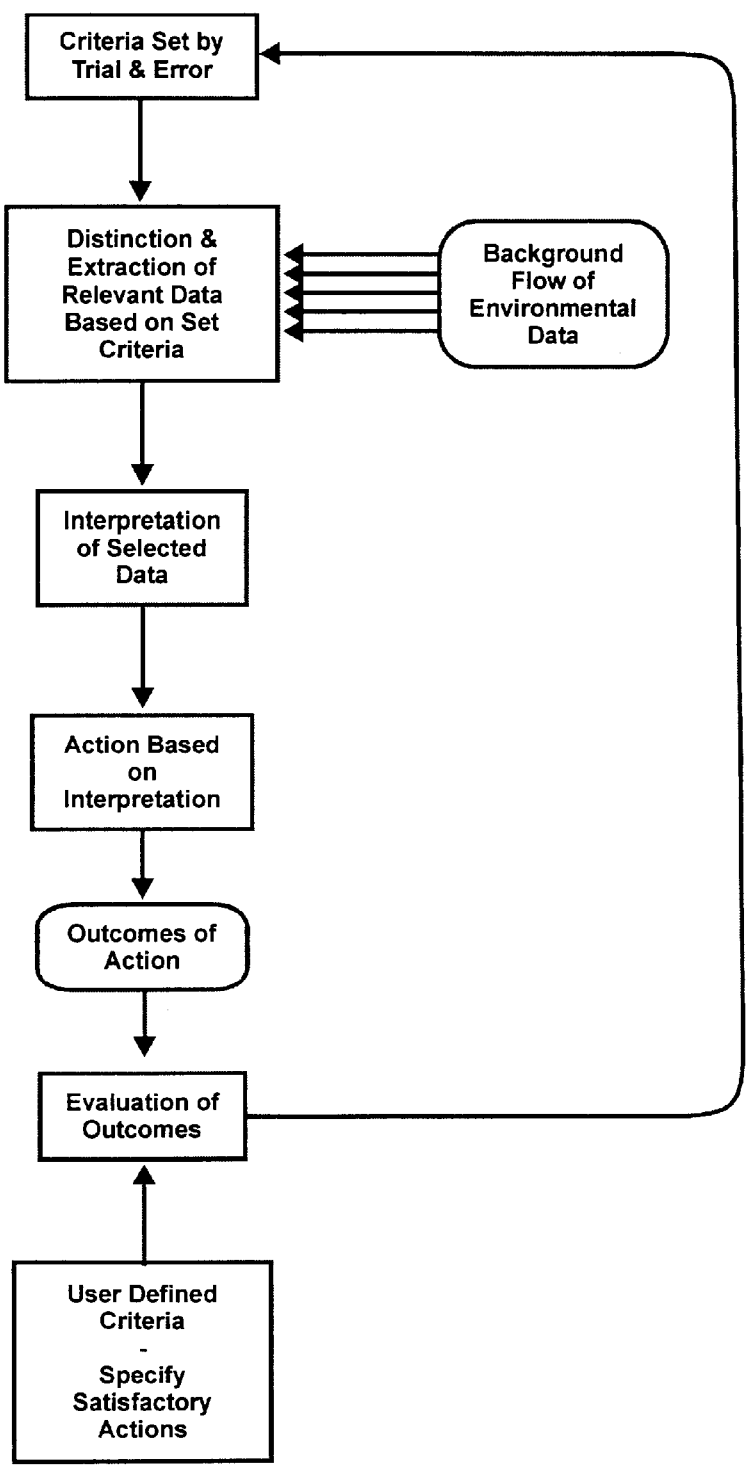
FIG. 7: illustrates a flowchart of the heuristic sequences involved in the interaction of the networked system with its environment.
Figure 12:
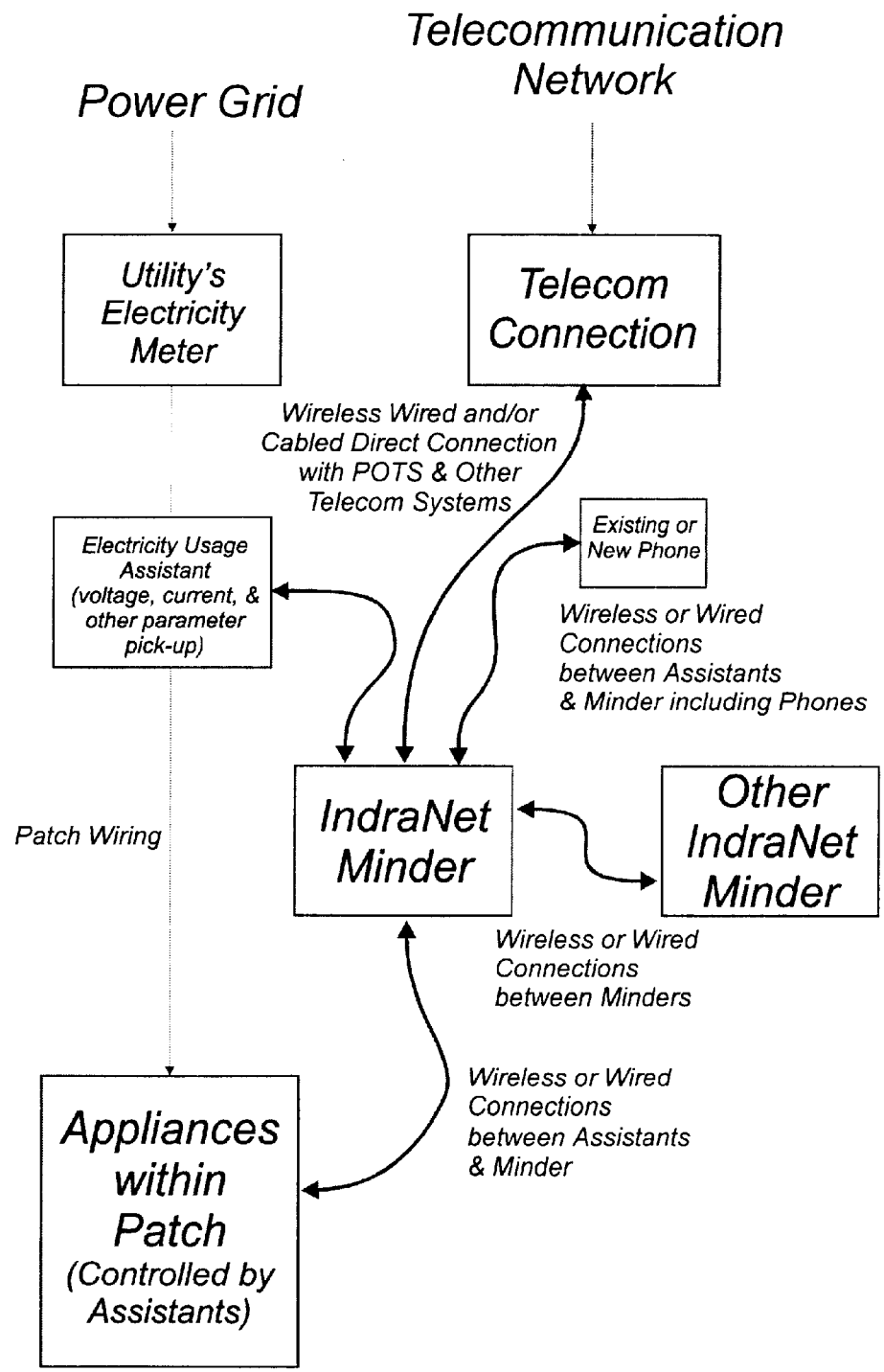
FIG. 12: illustrates schematically embodiments of minder connections in relation to networked systems hardware.
Figure 13:
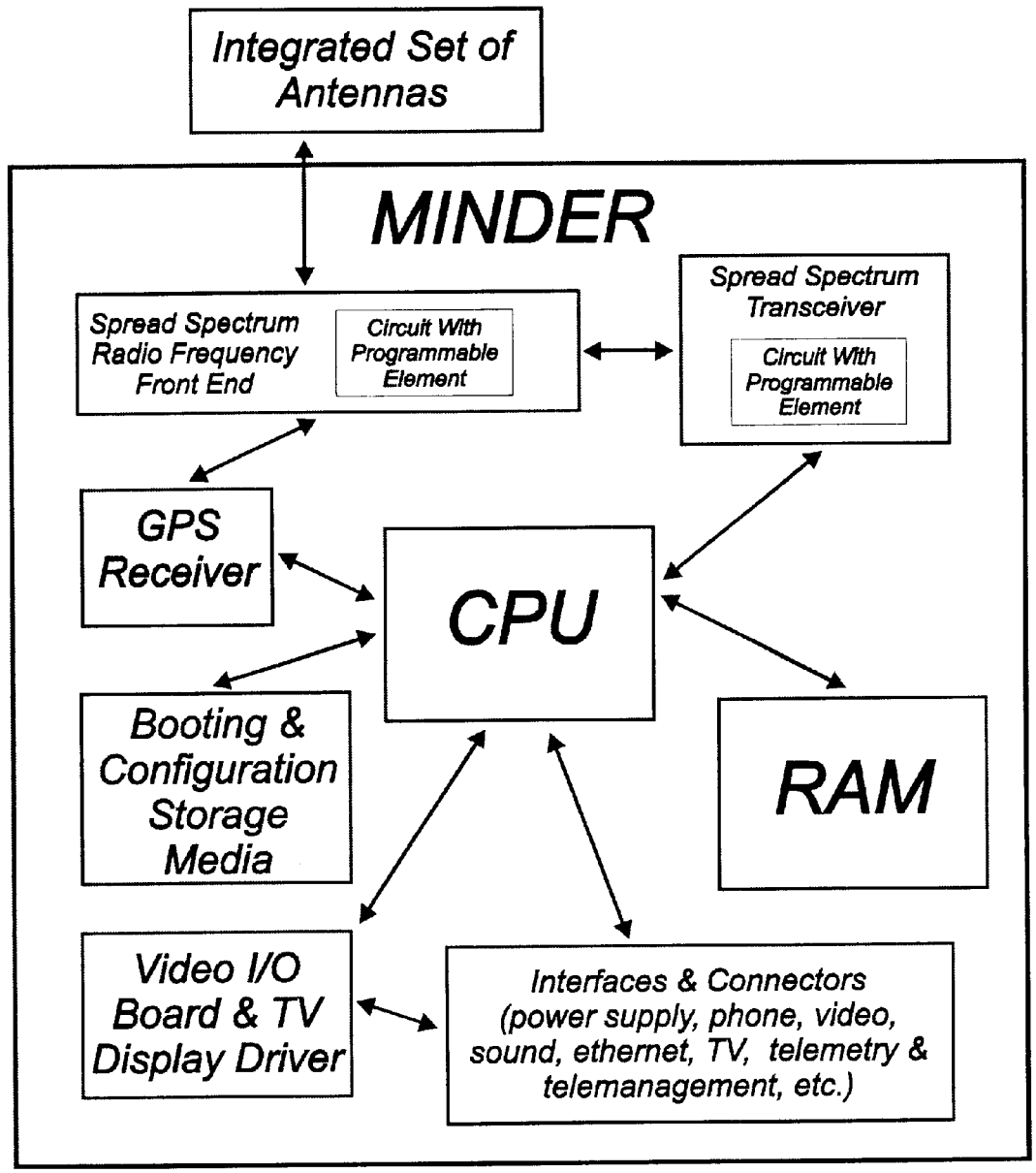
FIG. 13: illustrates schematically the internal structure of a Minder showing the generic location of programmable elements or components such as Dynamically Programmable Gate Arrays.
Figure 14:
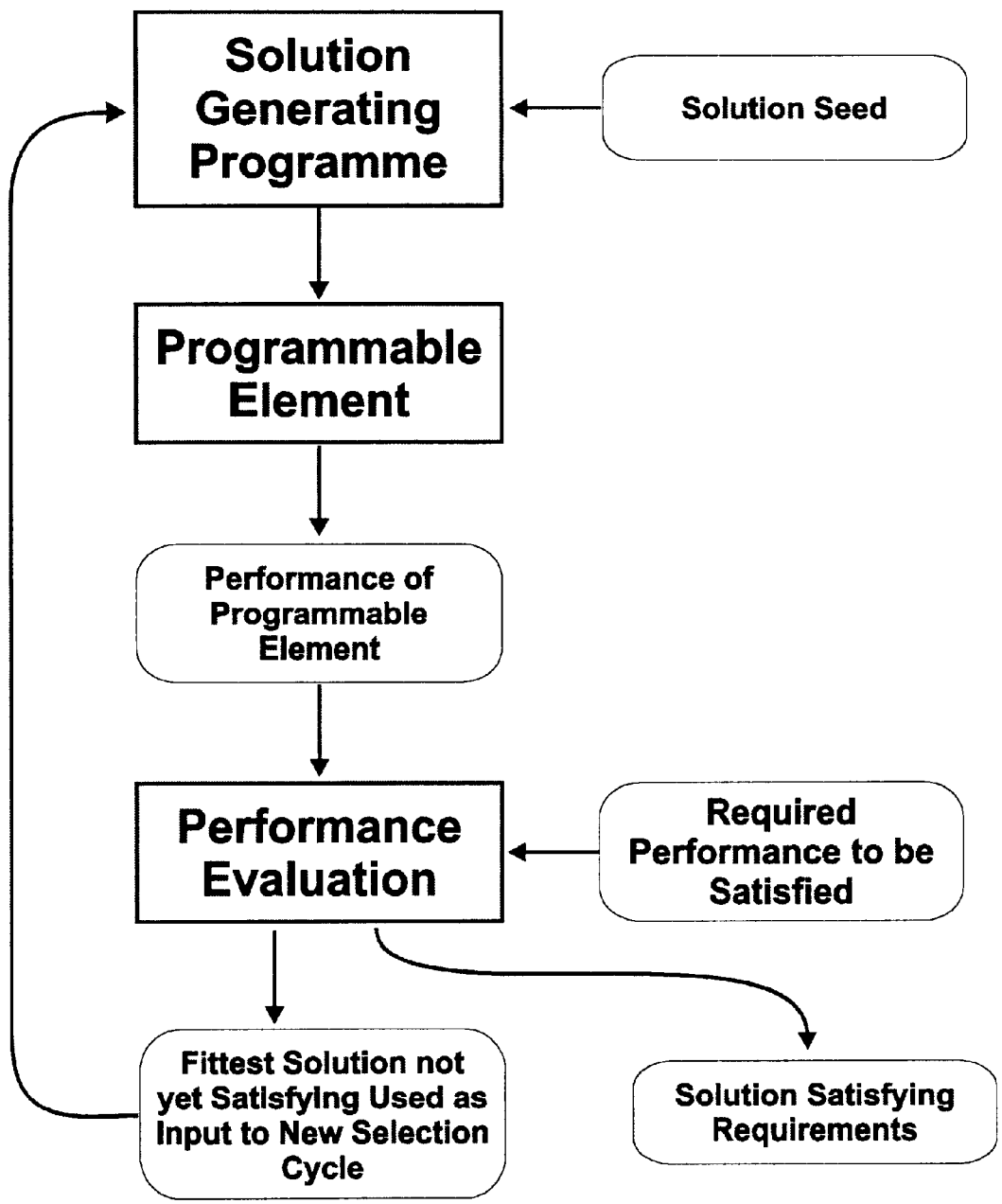
FIG. 14: illustrates schematically an outline of an evolution scheme for generating solutions.
Figure 15:
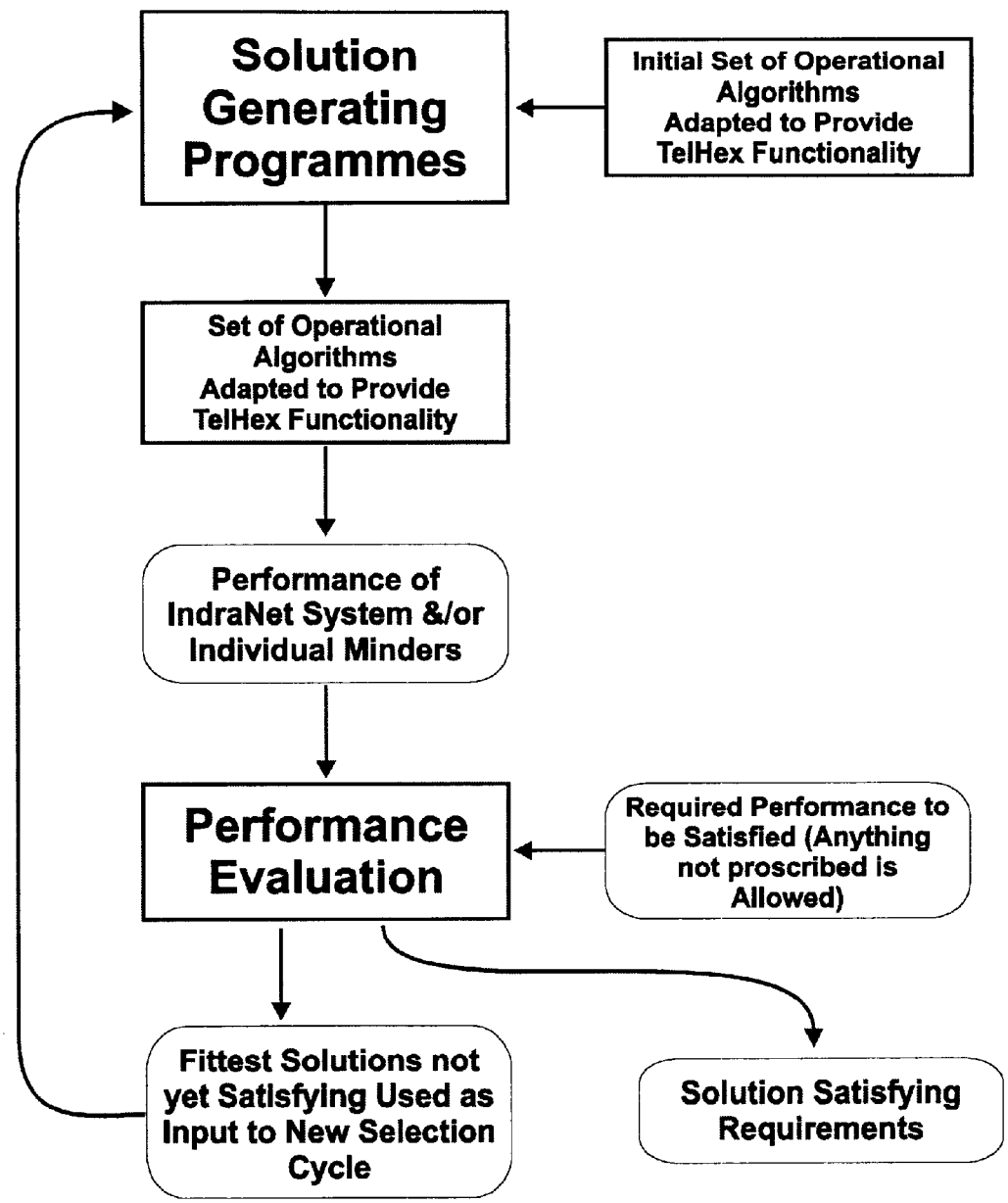
FIG. 15: illustrates schematically an outline of an evolution scheme for generating solutions by means of proscriptive logic.
Figure 16:
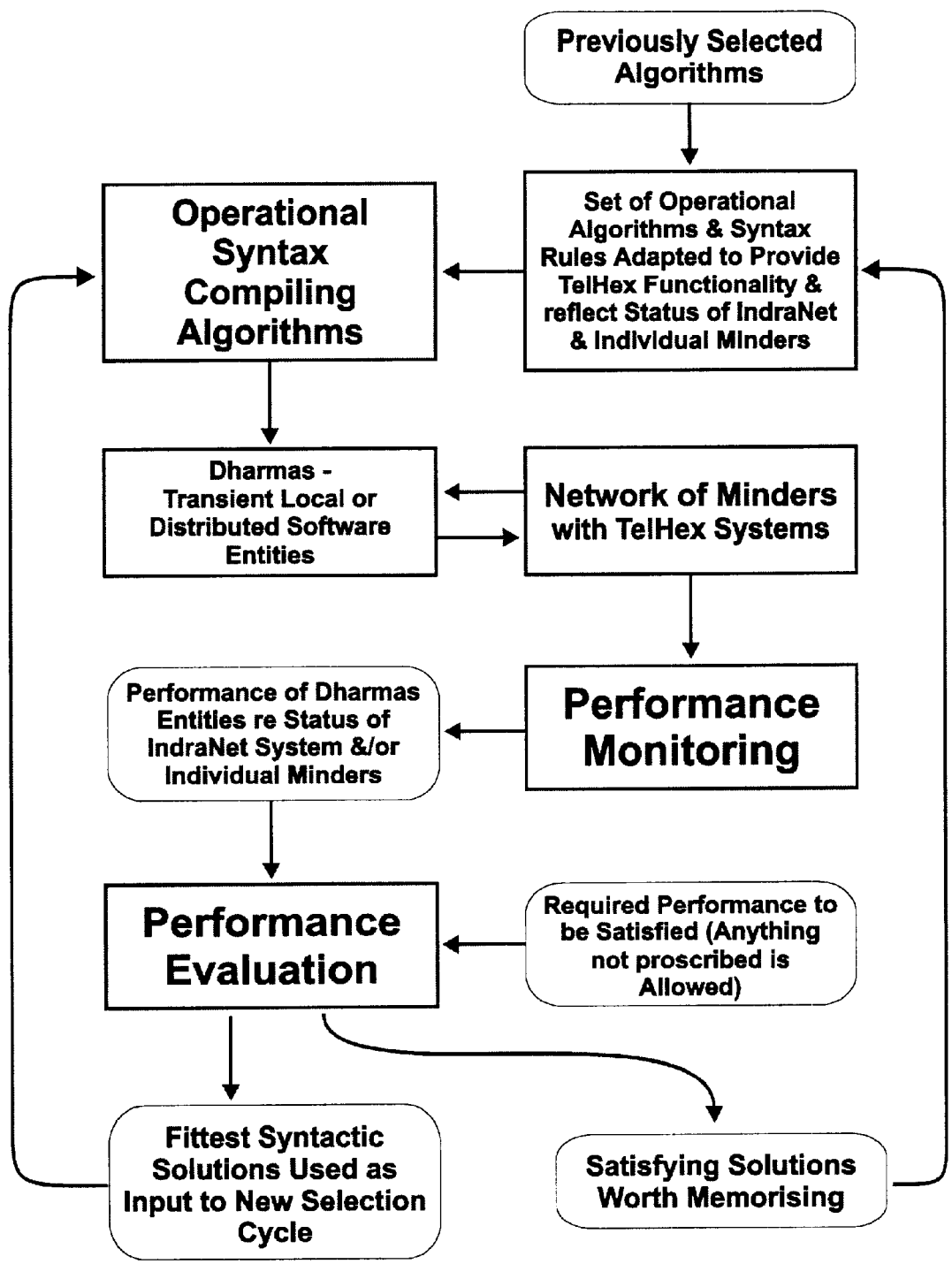
FIG. 16: illustrates schematically the creation of software entities which reflect the state of the network environment.
Figure 17:
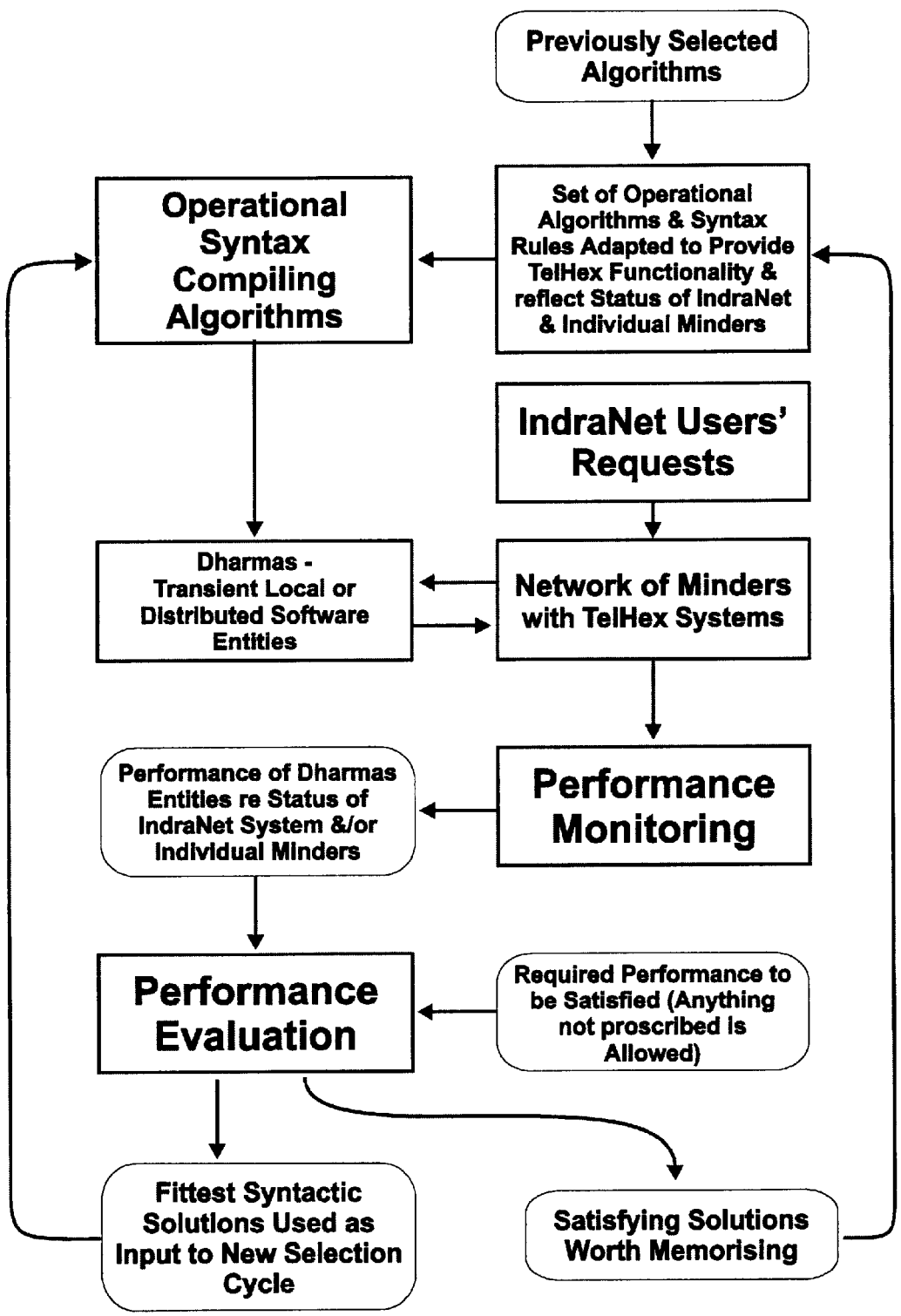
FIG. 17: illustrates schematically the creation of software entities which reflect the state of the network environment responding to a users requests.

Minders may have many physical forms. However, they will all share a number of specific features and capabilities that allow them to operate as nodes in the IndraNet mesh. Referring to FIG. 6, in a preferred embodiment of the invention, minders incorporate a transceiver preferably operating in the LMDS or LMCS range. Minder range may be between 50 m and 30 km. Of course, minders will incorporate hardware such as memory, processing means, antennae, location acquisition such as GPS functionality and power supply. As noted above, minders may be constructed to perform a specific purpose. For example, in a security application, a minder may include motion sensors, video output, alarms, etc. to endow it with the required telhex functionality. A minder may be wired into a building or vehicle or be a movable unit able to be carried by a person or affixed on mobile goods, objects, or animals. An example of the siting of a minder is illustrated in FIG. 4 with the addition of communication to another minder shown in FIG. 12.

Figure 5:
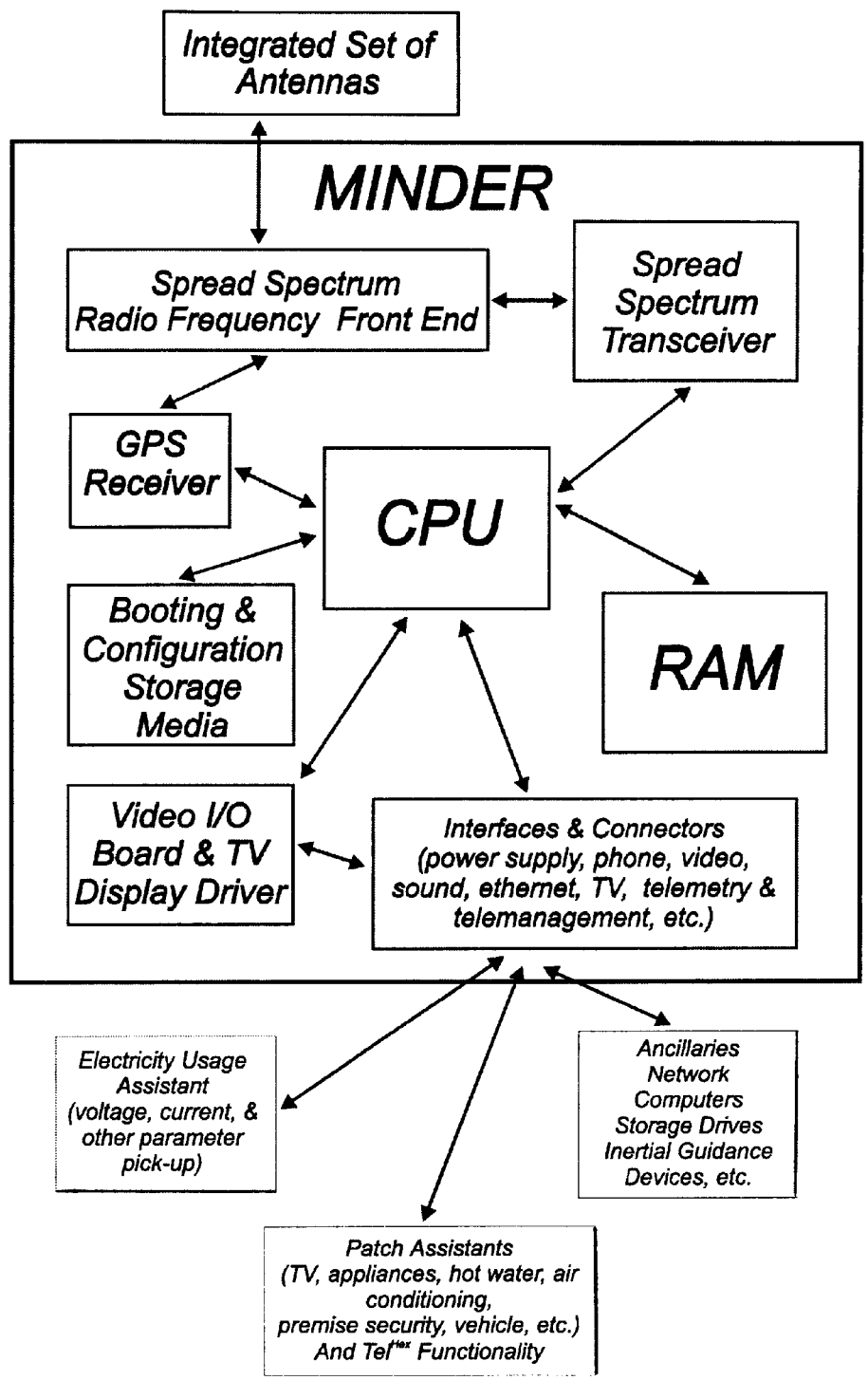
FIG. 5: illustrates the component structure of a basic minder.

The specific communication mechanism, while generally being wireless, may be wired in certain embodiments and in some applications (for example; electrical power supply monitoring) this may involve physical connection to a utility or telemetry device. An example of a minder interface with a power supply utility and a communication network is shown in FIG. 5.

Figure 3:
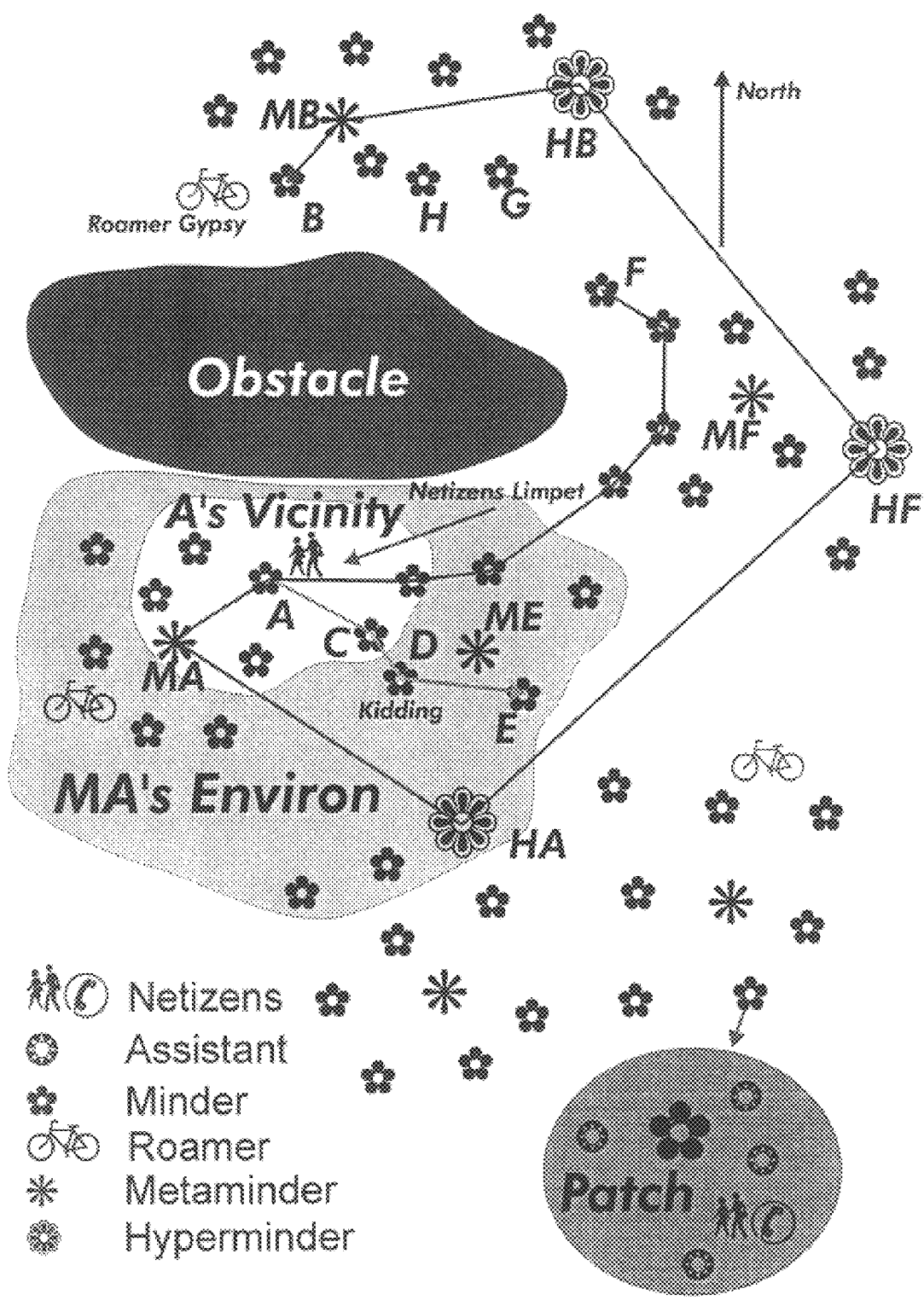
FIG. 3: illustrates a conceptual schematic of an example of communication within a network according to the present invention.

Patch: a static piece of real estate (e.g. house, garden, factory, warehouse, and the like), a static portion of geographic space (such as a forested area, wilderness area, part of a river, stream or estuary, and the like), a part of a city or inhabited environment (such as a road junction, a railway crossing, a car-park, and the like), or a mobile entity (e.g. car, human, container, packaged goods) which is minded by a minder. The fractal structural relationships of a patch to the whole of an IndraNet are shown in FIG. 2 and FIG. 3.

Minder Types: while all minders are structured similarly there are various types of minders with more or less extensive capabilities:

Standard Minders: a minder can be fixed or mobile. Standard minders are fixed and mind a fixed patch;

Roamers: mobile minders. While basically similar to standard minders, roamers can have slightly different characteristics and capabilities as required for specific implementations, such as engine telemetry, tracking and navigation capabilities, and so on.

Personal Minders (PMs) and Goods Minders (GMs): PMs are simplified and miniaturised roamer minders that are hand-held. In their simplest form their functionality is that of a cell-phone. In a preferred embodiment of the invention PMs have videophone and other additional telhex capabilities. GMs are miniaturised simplified minders that can be affixed to or inserted in goods to carry out a range of networked and local services based on telhex functionality. Suitably designed GMs can also be attached to animals for specialised telhex services.

Assistants and Patch Meshes: basic minders co-ordinate miniaturised cybernetic devices called assistants to perform specialised tasks on the patch they mind (such as distributed/decentralised energy management tasks and functions). Assistants are localised and mostly confined to each minder's patch. Assistants are structured as a mesh networks like the rest of the IndraNet they belong to. Thus patch meshes are the finest manifestation of the fractal mesh structure of the IndraNet. While in a preferred embodiment assistants interact with their patch minder to communicate with the outer world, in the most general form of this invention there is no such limitation. Assistants on different patches can cooperate directly with each other, and use the same communication methods and algorithms as standard minders. The fractal structural relationships between assistants and patch meshes and the whole IndraNet are shown in FIG. 2.

The physical structure of assistants may be likened to peripherals that complement one or several minders to assist it or them in local patch telhex functions. Assistants can be wired but are preferably wireless. A set of assistants is structured as a small mesh that is self-similar as is the whole of the IndraNet. Its function is to incorporate into the broader net, peripheral devices such as voice phones, video cameras, PCs, NCs, home electrical devices, item tags for article identification and similar, and more broadly any devices or means that can be usefully networked to satisfy the requirements of users.

Metaminders and Hyperminders: a metaminder is an enhanced minder that minds a group of basic minders. It is static. It has enhanced capabilities in terms of information throughput, bandwidth, CPU, RAM, and buffer permanent data storage. It occupies the next aggregation level up in the fractal mesh structure relative to minders. Similarly a hyperminder is a minder that minds metaminders, and is suitably enhanced. The fractal structural relationships between Metaminders and Hyperminders and the whole IndraNet are shown in FIG. 2.

Location and Nodes: Every minder or minder-like cybernetic device is located at a node of the overall IndraNet network. Every node is specified by a number of characteristics including, most fundamentally, position. Thus it can be seen that the physical form of the network is dynamic reflecting the nature and characteristics of the minders. In a preferred embodiment, each minder is "aware" of the location of all other minders present in its vicinity (defined below) at its level of aggregation and relative to other levels. This functionality may be absent from assistants who "know" that they occupy a given patch and are minded by a given minder. It is envisaged that there may exist a variety of node types including patch nodes, basic nodes, roaming nodes, metanodes, and hypernodes. These latter type of node are nodes occupied by metaminders or hyperminders respectively, while roaming nodes are nodes occupied by roaming minders, that is minders endowed with functionality corresponding to their mobile nature. A metaminder at a metanode stands for all the minders located at the nodes the metaminder currently minds. Thus the operation and interaction between the metaminders can be viewed as mirroring the interaction between the minders at a lower level of aggregation and again reflects the fractal nature of the mesh. The distinction between the various types of minder is, to some extent, artificial, as their generic role in the network is essentially identical in terms of the network model and paradigm. The detail of their operation provides a distinction as does the aggregation level which minders and groups of minders occupy. Similarly, hypernodes are occupied by hyperminders and correspond to the next level of aggregation in the fractal mesh. It is envisaged that more levels of aggregation can be added with minders and their nodes being distinguished by means of numbering or similar. Higher aggregation levels may be added depending on the complexity and function of the network environment. For example, as an IndraNet expands, higher levels of aggregation may be added to deal with coarse fractal aggregation at a global or national level.

Figure 9:
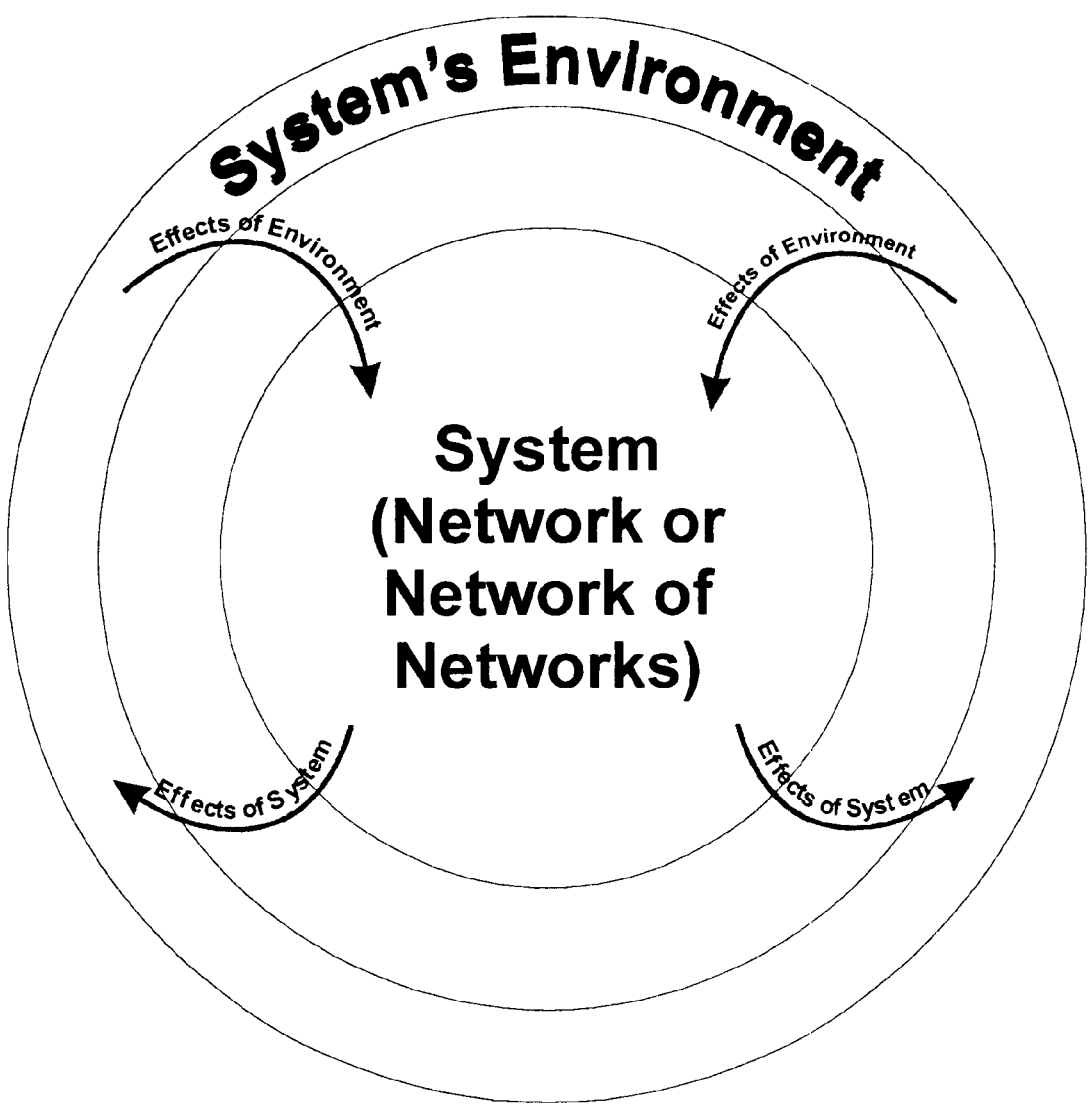
FIG. 9: illustrates schematically the fractal functional nature of a network and the interaction between the network and its environment.

The fractal structure of the IndraNet is illustrated in FIG. 3. These aggregation levels are not to be confused with a hierarchical operational structure. The fractal nature of the IndraNet is designed to be combined with the metonymic character of the addressing system to simplify the self-routing procedures. At all aggregation levels, and between levels, routing occurs through a mesh or trellis and is not predicated upon a tree-like structure. This is schematically shown in FIG. 3 with respect to the topological aspects of routing, FIG. 9 with respect to the fractal non-hierarchical structural coupling of the IndraNet system and its environment.

As can be seen from the above discussion, an IndraNet does not have a fixed topology in that its nodes are not organised or fixed in any specific pattern. Their spatial distribution is essentially random, they are wherever customers require a patch to be minded.

Range: Minders, being communication capable netizens, are further characterised by having a range. That is, a region within which a minder can call directly any other minder, metaminder or hyperminder or similarly a metaminder can call directly any other minder, metaminder, and similarly for higher levels of aggregations.

Vicinity and Environ: Various organisational models can be established for the structure of the IndraNet, incorporating the concept of vicinity and environ. A vicinity is defined for a given node by a set of minders located at nodes that are directly within the range of that given node. A similar construct applies to metaminders and metanodes. An extended vicinity is known as an environ. An environ is a spatial region in which contact processes take place. Contact processes are part of the Zen framework of the IndraNet Paradigm and will be discussed further below. Generally, an environ encompasses the vicinities of a set of minders that refer to the same metaminder or neighbouring metaminders. The notions of vicinity and environ are illustrated in FIG. 3.

The nature of the IndraNet inherently requires an innovative communication model to implement the fractal, self-similar character of an IndraNet. To this end, the fundamentals of communications systems have been considered independently of established methods and models and an innovative network paradigm has been developed to implement the invention.

As noted earlier, present communication system models do not accurately reflect how people actually communicate. As a result, there is an increasing gap between the capability of present telecommunications and networked operations, and the requirements of the customers using such networks. One of the aims of the present invention is to create virtual cybernetic entities that parallel closely how people communicate. By analogy with the language of Zen, these cybernetic entities have been named dharmas. In the present context, dharmas are transient logical entities created at the level of a minder and/or through the co-operation between two or more minders for the purpose of carrying out specific operations or tasks. Dharmas are the means of implementing the autopoietic, and in particular self-managing, self-routing character of an IndraNet.

Dharmas are software entities created by evolutionary aggregation of simple algorithms drawn from a library or lexicon of such algorithms. Algorithms drawn from the lexicon are aggregated by means of a suitable syntax and are installed in minders externally or learned as part of the normal operation of minders and of the endless process of creation and extinguishing of dharmas. In the latter case, they are essentially specific aggregations of simpler algorithms that have previously proved useful to individual minders or to the network as a whole and retained to be added to the lexicon. This process is shown schematically in FIGS. 7 and 14 to 17.

Dharmas are not bound by, and inherently do not use, the Aristotelian logic commonly used in known Distributed Artificial Intelligence. Although dharmas can be located in a given minder during their transient existence, they are inherently non-local and can manifest themselves across two or more minders.

The above terminology will now be used to describe the key features of the operation of an IndraNet:

IndraNet operations occur preferably through distributed activity layers. Distributed means that while the physical aspects of said layers are implemented at the level of minders, their software operations are distributed throughout the network as required in each specific instance and take place by way of dharmas.

An example of IndraNet Activity Layers is described below with reference to their Zen names and FIG. 10:

Roku-Nyu: the activation of the telhex functionality through the cybernetic equivalents of the six sensory organs (such as sensors, video cameras, and so on, and collectively labelled Kon by reference to the Zen framework) corresponding to the six objects of perception (material or not, referred to as Kyo).

Shoku, Contact: refers to the processes through which the Kon devices providing telhex functionality interact with their Kyo objects of perception. Contact occurs primarily at the level of minders and assistants. It involves a set of dharmas (referred to as Shiki) that operate at the level of the sensory systems to select meaningful information from the streams of sensory data supplied by the sensory devices. Contact is used to relate to people, in particular users of the net, patches and objects on patches, and an IndraNet's own hardware and software. The set of Shiki dharmas also provide the system with awareness processes that ascertain that these sensory contact processes are happening.

Ju, Feeling: feeling integrates the sensory data into specific perceptions in ways enabling higher decision making and meaningful interaction with people. By analogy with human experience feeling, for example, can be basically structured as pleasurable, unpleasurable and neutral through suitable ranges of degrees. In particular embodiments feeling can be structured as relations of identity with sets of criteria modulo corresponding relationships ($E \equiv K$ Modulo A). The integration of the individual feelings (crudely such as a rating on a scale) gives an overall rating from pleasurable through neutral to displeasurable that can be expressed as a multidimensional vector. In an IndraNet Ju, feeling, encompasses the full set of telhex functionality.

So, Discernment or Conceptualisation: this set of dharmas translates perceptions into specific concepts and generates generic reflex responses to events. It does so on the basis of Ju and Shoku data by identifying relevant responses, selecting ranges of options for each in terms of levels or degree of action and scheduling. Depending on their nature and the situation (such as emergency or not) the responses are actuated directly or referred to the Gyo layer (see below);

Gyo, Intent: in the specific sense of IndraNet "intent" refers to the manifestation of will from moment to moment by references to the objectives an IndraNet is required to achieve and data from So, Ju and Shoku. For example the intent to achieve a given overall objective, say minimise power use for a household on a patch, is translated into a series of intent dharmas of partial objectives that then lead to the creation of relevant action dharmas. Intent mediates between So and Shiki;

Shiki, Attention (Vijnana, Mana): focuses and holds the awareness of the network, or parts or aspects of it, at a local level (such as a patch) or in a non-local fashion (such as in order to manage communication routes) on some object of attention. There can be, of course, many parallel streams of attention, each with their networks of dharmas.

Shiryo, Consciousness: this refers to the judgement and discrimination capabilities of an IndraNet. Such capabilities include any suitable heuristic or expert system based decision making processes, including referring to human assistance and decision;

Alaya, or Fushiryo, memorisation/recollection: this layer watches the operation of the whole net. It stores and retrieves relevant data. Alaya is stored both locally at minder level, and non-locally with respect to the activities of the net a whole. Information stored by Alaya is experiential: It focuses on performance, quality of performance (such as degree of satisfaction of criteria), and selection of useful material for future reference and use.

Preferably the IndraNet layering is adapted to include layering of existing or new networking and telecommunications standards and protocols such as TCP/IP, ATM, GSM, Myrianet and the like.

Because IndraNets are designed to operate in symbiosis with human societies that are constantly changing, IndraNets' structure and operations must be evolutive. The IndraNet Paradigm, the dharma cybernetic software entities and their rules of operation through the Activity Layers, enable the system to evolve at all levels of fractal aggregation. This encompasses two forms of evolution: evolution by design, and evolution of operations. These evolution regimes are shown in diagrammatic form in FIGS. 14 to 17.

Figure 10:
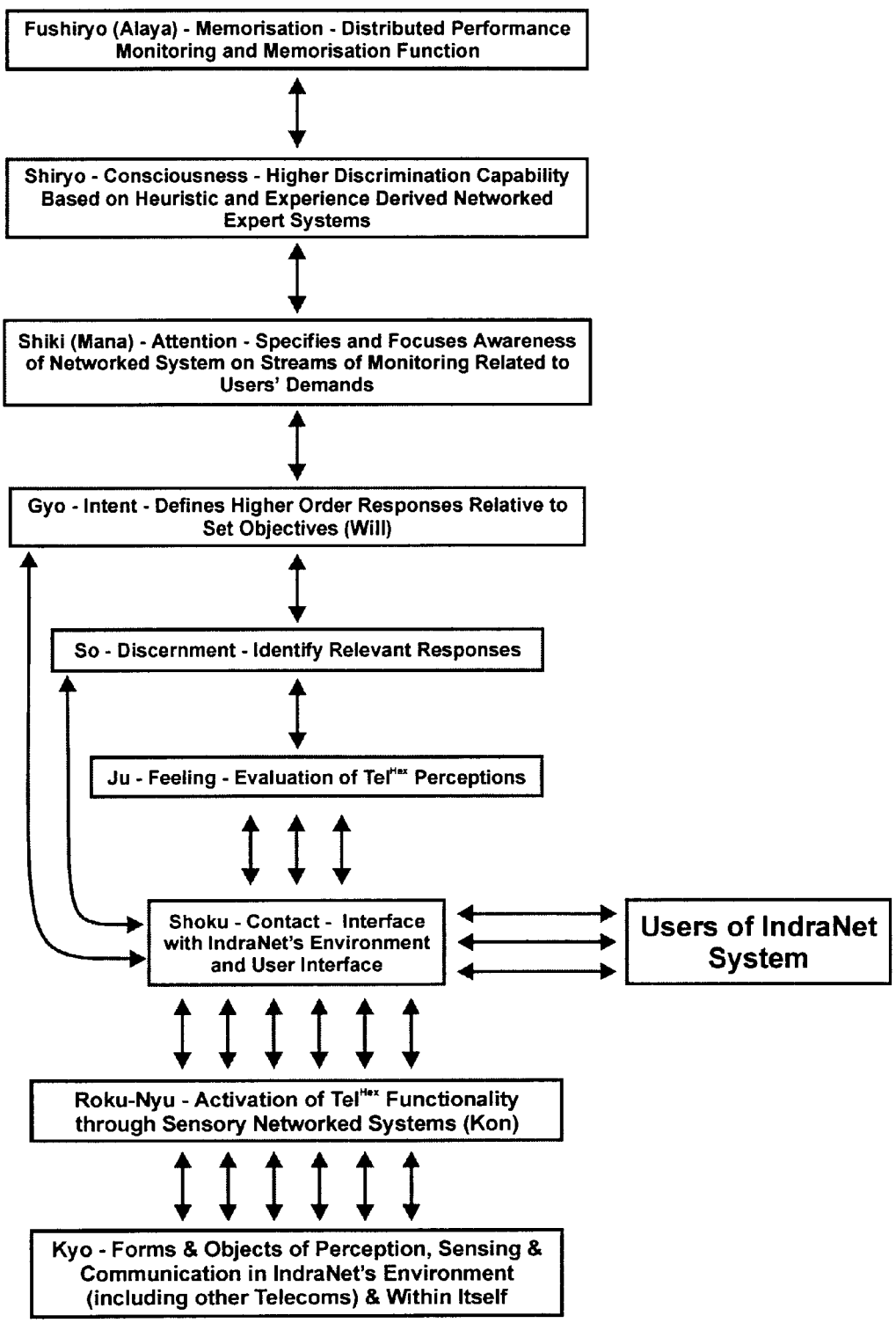
FIG. 10: illustrates the layers of telhex functionality with reference to Zen forms of operation, the latter given by way of example.
Figure 11:
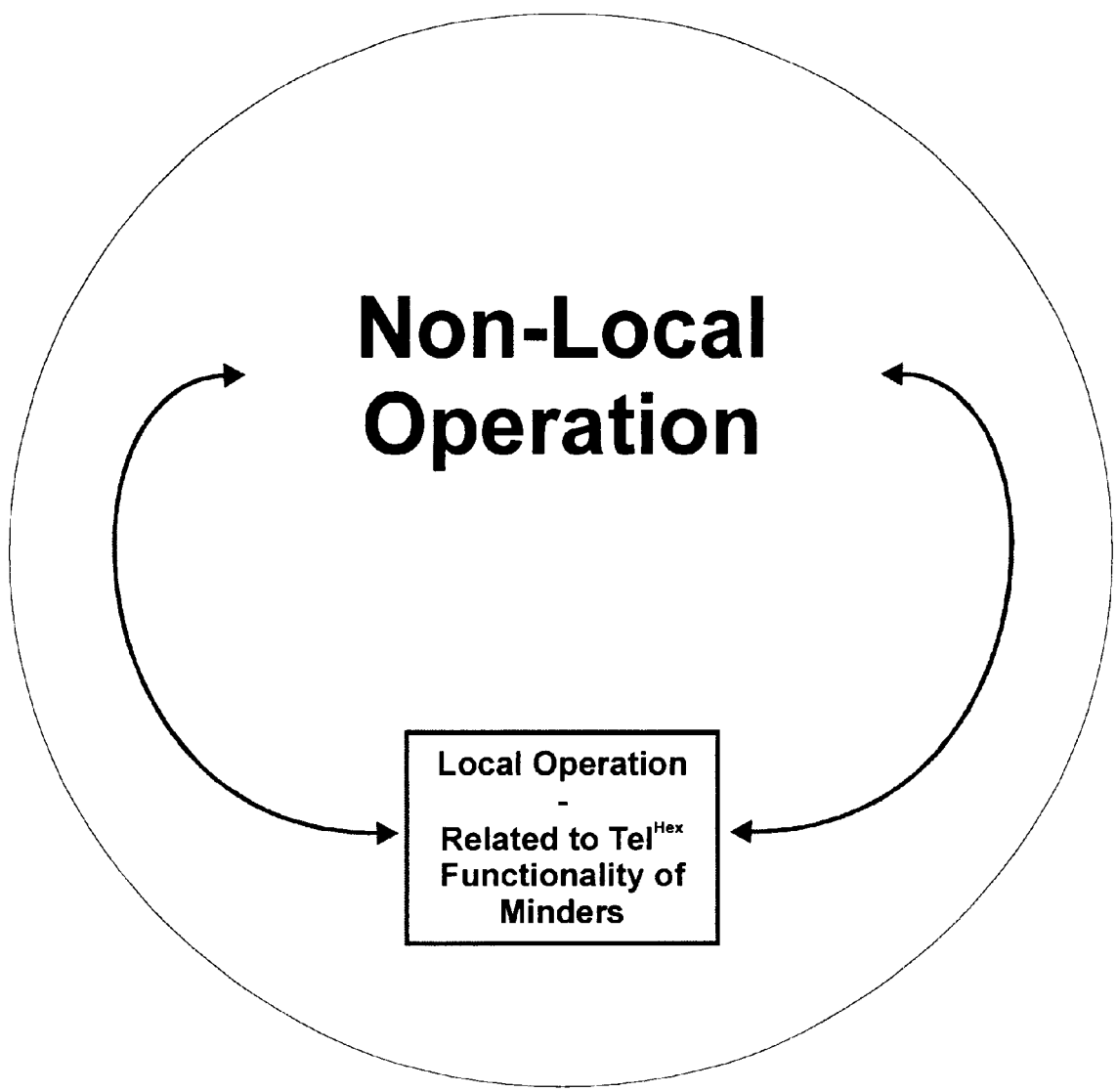
FIG. 11: illustrates the non-local/local operational distinctions of the minders' functionality.

The former refers to the evolution at the lower order layers such as the Roku-Nyu and Shoku layers illustrated in FIG. 10 and relates to all aspects of telhex functionality. This form is based on the use of iterative programming methods that emulate Darwinian evolution. An example of this method was presented earlier by reference to the evolution of IndraNet transceivers. This method can be implemented by any suitable means such as genetic algorithms, simulated annealing algorithms, backpropagation of errors or other similar iterative procedures.

Figure 8:
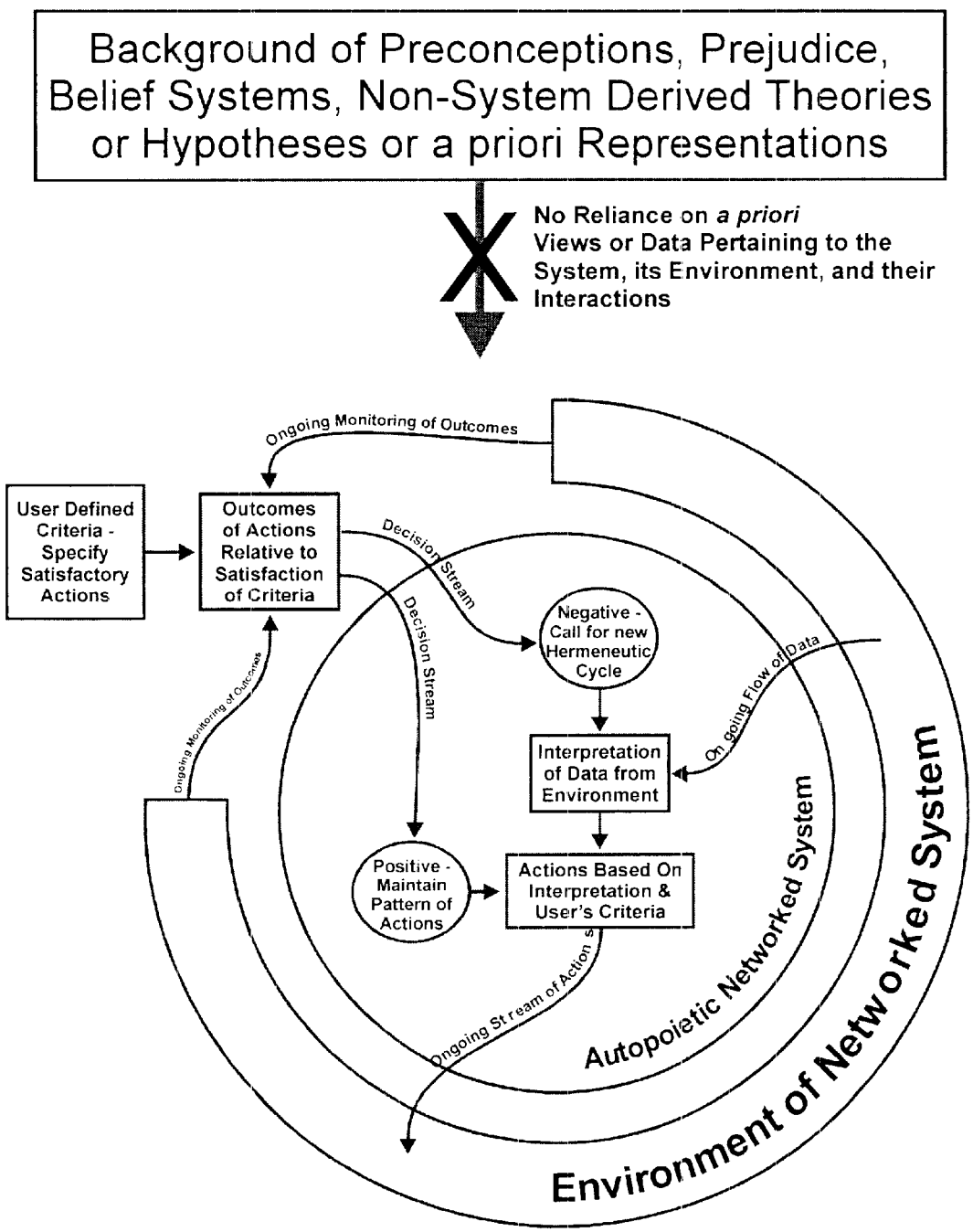
FIG. 8: illustrates a procedural schematic outlining the distinctions from a priori approaches.

The latter, the evolution of operations with respect to any aspect of an IndraNet, is achieved through higher order layers such as the Shiki to Alaya layers illustrated in FIG. 10 by way of suitable dharmas. Experiences assessed in terms of quality of performance are memorised and selected according to the proscriptive logic and method of evolutive satisfaction of the IndraNet Paradigm. This process is illustrated in FIGS. 6 and 8.

The layered functionality of IndraNet as exemplified above is used to implement communicative actions. Communicative actions are generic logical methods and processes designed to achieve cost effective operations at all levels of an IndraNet. They do not describe software operations or algorithms. Rather they describe in logical plain language how the network functions. These communicative actions are effected through networks of dharmas, which are themselves transient aggregates of basic algorithms. The set of communicative actions is not finite. New actions can be evolved by a specific IndraNet on the basis of its own prior experiences. The methods to develop dharmas and the distributed structure of activity layers are used to evolve and implement communicative actions throughout the network.

The following description of such communicative actions proceeds by way of examples regarding telecommunications. On the basis of those examples, people knowledgeable in the art will understand how the fundamental IndraNet principles can be implemented in similar ways to achieve all aspects of IndraNet functionality in specific applications.

Use of pilot links and minders' co-operation within an environ to establish, maintain and manage links: An environ is used co-operatively by minders to decide how to establish routes. An example is shown in FIG. 4 whereby a communication link is established between A and B. Minder A connects with distant minders C, E or B by establishing a pilot link, that is, it searches and finds heuristically a close to optimum route from A to B through a number of nodes, metanodes, and hyper nodes, with the assistance of other minders in the vicinity, and of meta and hyper-minders as required in each instance. This searching is carried out, for example, by A sending a pilot message interrogating minders as to availability for specific connection purposes, including to enlist minders to cooperate in establishing further links so as to reach a distant minder such as E, and monitoring responses to this query from minders in its vicinity.

When the pilot link has been established it is "booked" and "maintained" for a while, to effect a specific connection. The duration of the booking and maintenance of the link is defined according to the nature of the communication, and its priority ranking. Nature and priority ranking refer to the type of information being transferred such as digital data, voice, picture, video, one way, two ways, real time, and so on, and to the transmission requirements for such type of information. According to the present invention, nature of communication and priority ranking are generic logical entities used to describe the basic mode of operation of the net and its intrinsic logic. Actual definitions and categorisations of nature of communications and priority types for ranking purposes are specific to each implementation of this invention and represent specific alternative embodiments thereof.

For example, in a given IndraNet, a video-on-demand transmitted via buffer-memories in a string of the minders could be temporarily interrupted, relative to the size and status of the chain of buffers, to allow other traffic along the same link or part of link or cross traffic, using one or several nodes of the link. A voice or videophone communication, however, cannot be interrupted but can be multiplexed. In a given implementation, the duration of a given link is thus contingent upon the nature of the link, the status of the nodes involved, the definitions of priority in that particular net, and, optionally, contractual arrangements between the Core Agency or firm that has established and that operates an IndraNet and its subscribers. Once a link has been established between two or more distant minders (such as in the case of a video-teleconference), the connection is constantly updated according to the requirements of this particular connection (such as demand for bandwidth expansion to accommodate a shift from data to video), and according to the changing circumstances of the intermediary nodes for other traffic.

As will be described below, this is effected through the creation of non-local software entities that carry out the logical operations of link monitoring and updating and then vanish. In its preferred embodiment, IndraNet uses such entities to achieve packet switching-like capabilities to make optimum uses of any multiplicity of paths between the two or multiple ends of a link or connection. For example, a connection between A and B could be started through nodes X, Y and Z, say {A, X, Y, Z, B}. Through software entity monitoring and updating, it could be shifted and end-up being routed with an alternative set of nodes K, L, M, and N, thus becoming {A, K, L, M, N, B}, and/or a combination of some of the original nodes and new ones, such as X, L, Z, thus becoming {A, X, L, Z, B}. Such shifts in individual packet routing occur while the information transfer is taking place. In other words, through the operation of dharmas, digital packets for a given communication are automatically routed via different node sequences depending on other traffic through the net. Priority rankings are stored in tables at the minder level, and updated according to each minder's prior experience and contractual arrangements at and for that minder.

Topological Self-Routing: when minder A calls minder B, it already knows where both A and B are (their respective addresses) either because the address of B was given to it or because it obtained it through a specific search. A uses the location part of both addresses to compute the overall distance and bearing of the intended link. If the distance is significantly higher than its own vicinity radius, A knows it needs help from minders in the vicinity or from its meta-minder. It uses fuzzy logic algorithms to compare the absolute A-B distance with its vicinity radius, and that of its immediate neighbours (notion of environ) to gauge the best and second best options, such as hopping from node to node via neighbours in its vicinity and within its environ to establish a pilot link and manage the connection, or enlisting the assistance of its metaminder because B cannot be reached easily within the environ. Minder A also learns from accumulated experience, that is, it monitors degrees of success, patterns and frequencies, in particular with respect to changing circumstances at various moments in time (such as daily, and seasonal cycles). The learned patterns can be memorised, for example, by caching processes. FIGS. 14 to 17 illustrate steps in an evolution scheme for generating such desired solutions. Minders, A in the above example, use the bearing to restrict and simplify the routing process. For example, A would preferably avoid looking south to establish a specific routing if the end-point of the completed link, B, is towards the north. However, this is corrected by self-learned experience with respect to the local topology and topography. If there is no direct way north because there is a hill or lake with no node on it, as shown in FIG. 4, for example, A may have found out through accumulated experience that medium distance north-east, such as to contact minder F, is best reached by contacting first a set of nodes on the east, and that very distant north, such as to reach B, is best reached going south straight to local metaminder $M_A$, actually located to the south-west. In the latter case $M_A$ in turn tends to establish a metalink through other metaminders distributed to the south-east, such as $H_A$ and east, such as $H_F$, before reaching $H_B$ to the north, and completing a link with B, located due north from A but beyond the Obstacle.

Similarly, meta and hyper-minders learn and remember. In a particular embodiment of this invention, the dharmas that effect the self-routing use routing tables based on the numerical addresses of the minders, and their current locations. The minders learn and also forget, that is, the retention in memory of successful experience is indexed to sets of criteria such as intensity of use and priority ranking, and is time related, so that, for example, old patterns that are no longer relevant are routinely culled from memory.

Kidding in the vicinity: kidding is a particular example of applications of the Shoku (Contact) dharma-based set of processes through which IndraNet netizens such as minders interact with their environments. The vicinity and environ are defined mathematically in a fuzzy way. IndraNet makes use of this fuzzy status in its algorithmic decision process. A given minder A knows which other minders are in its vicinity and in its environ. With reference to FIG. 4, if A wants to connect with C and C is in its vicinity, A establishes a link immediately at that level. If it wants to connect with E, and E is not in its vicinity but is nearby, in its environ or in $M_A$'s environ, it uses bearing data to contact minders in its vicinity such as C, and asks for their co-operation to establish a link to E. This process is called kidding by analogy with children who often subconsciously like to test the adults who mind them to check out how far they can go, push things, bend the rules, be smart, and so on. Here, similarly, A kids around to test whether it can nudge some of its neighbouring minders to give it right of way to reach E nearby instead of asking its metaminder's assistance. If E is not in C's vicinity, C in turn kids around, and, say, finds that D, at this particular moment in time, has spare capacity and is able to connect to E in its own vicinity. Thus the link A-E is established by kidding {A, C, D, E}. The ability to do this depends on the nature and intensity of the local traffic at the time, and any particular topographic and environmental feature, such as creating shadowing effects. In particular kidding enables IndraNet to automatically resolve shadowing problems, such as created by a large building between, say, C and E. In this example C kids D, that has direct line of sight, to connect with E. As can be seen in this example, kidding is an elegant alternative to the overlapping multiple cell strategies currently developed for implementation of LMDC or LMCS based telecommunication services. The minders involved in establishing such links learn the lessons and remember (see FIG. 7).

If, because of traffic at the time, the {A, C, D, E} link is not feasible or no longer suitable, A might go to $M_A$, and the link might be established via {A, $M_A$, $M_E$, E}. However, it could also be {A, $M_A$, D, E} if $M_A$ finds it can kid D and E in its broader environ. This latter example illustrates further the co-operative, non-hierarchical nature of the IndraNet. In all cases, the minders involved keep kidding around in the background, while a metalink like {A, $M_A$, $M_E$, E} has been established, in case circumstances in the vicinity have changed and/or a past learned lesson is no longer applicable, or if a more directly link becomes feasible, or a new longer link becomes required because some nodes become involved in other traffic with higher priority ranking.

The notion of environ is more particularly relevant when two nodes are at the edge of the vicinity of each of their respective metaminders, and are also relatively close to each other but not in the actual vicinity of each other. This is when kidding minders located between two end minders of a particular connection can be more effective than these minders going to their respective metaminders for a metalink. As it can be seen from the above, the kidding strategy is extremely flexible. With minders of a suitably long range, it can be implemented with low-density networks. The low inherent cost of minders makes it easy to expand the network fast. Because at such low costs, minders are designed to embody substantial CPU and memory over capacity relative to the requirements of their patch, any new minder equipped node increases the overall capacity, resilience, and flexibility of the IndraNet. Further, increasing minder density facilitates the elimination of shadowing effects through kidding (as described above) at minimal costs to the net and its users.

The operation of IndraNet, and more specifically its above-described communicative actions are implemented through dharmas.

In complementary embodiments, the above described topological routing is implemented through topological and thermodynamic means whereby the dharma-like relationship between nodes A and B of a link is expressed through a specific surface or map of the space between A and B that reflects the state of minders between A and B according to a minimal set of physical parameters such as one or more scalar and or vector potentials reflecting the status and state of each node, temperature of transmitted data packets while at each minder, an index that, for example, reflects the quality of service parameters, such as latency, for a specific link, and attractive or repulsive charges affecting routes.

The surface linking A and B is defined by the potentials at each node in the mesh and the distances between nodes and the overall distance between A and B expressed by a suitable metric. Packets carry a destination address and a temperature, and optionally an index or set of indexes.

In particular embodiments of the above generic type, the node A originating the link has a higher potential than the end point B which has the lowest potential on the surface. The potentials of minders between A and B reflect their own particular state, such as affected by their patch minding functions and other data traffic. Packets flow from A to B automatically towards the lowest potential. The potential of minders encountered along the way increases as a function of their resource load. A high potential at a given node has the effect of routing traffic away from it. In its simplest form, this analogy is that of a marble rolling on slopes, roller coaster like, under the effect of gravity.

If and when a data packet is trapped in a low potential trough, its temperature increases in proportion to the duration of its stay at that location until it gains enough energy to escape the trough in a Brownian movement-like fashion and can then resume its flowing towards its destination point of lowest potential. More generally, packets will increase or decrease in temperature as a function of the difficulty they experience in escaping a region or vicinity relative to their point of destination.

The related algorithms amount to a stochastically modified surface descent algorithm. For example, at each node and for each packet, the potential of neighbours in the vicinity is evaluated based on their periodically updated potential, or through kidding processes described earlier, and probabilistically selects the next hop based on those potentials. Vector potentials may be used to bias such probabilities for packets travelling in various directions by applying a local tilt. Such means, as well as actual potential values at each node, can be used, for example, to implement the effects of previous memorised experience.

Vector and scalar potentials at each point of the IndraNet mesh may also be affected by functionality parameters, such as required quality of service with the effect that, for a given data packet, passage through a minder or a set of minders can be facilitated or hampered. This is achieved, for example, through algorithms building up an aggregate index from all the relevant parameters, that in turns increases or decreases the potential of a given minder.

Similarly indexes reflecting quality of service requirements can be attached to packets for a given transmission. Such indexes, for example, may place various levels of premium on using more or less loaded minders depending on their latency requirements. Indexes of packets with low latency requirements will also induce easier increases in packet temperature and facilitate exit from local troughs.

In complement, attractive and repulsive charges can be affected to data packets and aggregate data traffic flows to assist in local routing around obstacles and out of potential troughs.

In the above description of dharma topological routing, the topology is transient and specific to each data packet transmission between A and B and to A and B themselves. It expresses the specific transient relationship that co-creates A and B for each other for the purpose of this specific communication. In parallel other such transient dharma relationships may co-exist between respectively A and B and other minders and other facets of their respective patches.

Further, the topology created by the local potentials is affected by the memory of the system and its learning abilities so that, as discussed earlier, memory and knowledge of effective routes at given moments in time, in the past, and recognised recurring patterns, selectively affect local potentials in the present transmission of data packets. Ineffective memories fade by way of having a reduced effect on local potentials while effective ones are reinforced. Memories are thus automatically corrected.

The above topological routing can be used in the establishment of pilot links described earlier as a prelude to more permanent links as might be required by some users or uses of the net, for example, to accommodate circuit switched protocols, or may be used as the sole means of routing packets through a multiplicity of routes distributed across the whole net.

The above routing example describes also how dharmas are specifically both local and non-local, such as specifying and co-dependently creating the states of minders and the relationships that co-create and maintain the whole net.

In this perspective, meta and hyperminders can be seen as providing the means of tunnelling or creating topological channels across large distances or, more generally, means of warping the topology so as to reduce distances between specific nodes.

Other aspects of dharma implementation are explained in more detail by way of examples as follows:

Schematic 8 and Schematic 10 describe how two minders are set to interact with each other, or one minder with objects in its environment. This communication model parallels people's interactions. More specifically, Schematic 8 characterises, for example, a specific link established between two minders or a minder and one of its assistants. It is by analogy with the above description, and to avoid thought patterns predicated on dualistic subject/objects analyses, in this invention, that such links, and all other modes and type of interactions within, with and between minders, are all called "dharmas".

While minders such as S or O comprise specific hardware and software components, the way they appear to users and their existence, in terms of the activities performed, is entirely contingent upon and the result of the series of relations created and annihilated between such components by way of dharmas. An IndraNet dharma is thus neither identical to S or O, yet, for the purpose of carrying out a task or operation and relative to an operation between S and O, a dharma can be taken as identical to S or O, or both, while simultaneously it is still some other entity that will vanish, be extinguished, as soon as the operation is completed. In terms of the logic of IndraNet operations, such a dharma is neither located at S or O. It is non-local.

The following simple example describes the function and effectiveness of dharmas to effect telecommunications, communications, and communicative actions. When a subscriber within the patch of a given minder S wants to call another subscriber on the patch of minder O, say for a video-phone conversation, and to do so interacts with S in any way consistent with making such a call, the interaction with S sets in train a whole series of dharma creations to effect the call.

For simplicity, we assume that the address of O is already known. S will first create a dharma D, to figure out where on earth O is located. D, will be created out of a sub-set of algorithms and will use the geographic co-ordinates in O's address. D, will then create a second dharma $D_2$ to gauge O's remoteness from S's own location and having created $D_2$, D, will then extinguish itself, that is, vanish. Let's assume, for simplicity's sake, that this second dharma $D_2$ has found out that O is in S's vicinity. Before extinguishing itself, $D_2$ will trigger the creation of $D_3$ to contact O. $D_3$ gets S to send a signal calling for O. Because O is in S's vicinity, it can, and does, respond directly, through suitable further dharma creation Dr. In effect, $D_3$'S call alters O's state relative to whatever O was doing up to this point (such as monitoring energy use, responding to subscribers on its patch, and answering other calls from other minders). By its response, dharma $D_r$. aggregating with $D_3$, O immediately shares its state of minding with S, so that with respect to minding awareness (that is S and O knowing what each is presently doing) S and O are no longer distinct, a new dharma has arisen that is non-local even in a logical sense. This new dharma can be called $S\text{-}O_a$ (a for "awareness"). $S\text{-}O_a$ determines the capability of O to receive the call and, if feasible, such as if the called person is present and willing to receive the call, $S\text{-}O_a$ creates further dharmas to effect the call. One of these dharmas will be the specific link $S\text{-}O_i$ between S and O. It will be created by allocating the required bandwidth, setting the priorities corresponding to videophony relative to other traffic, allocating CPU resources in S and O, and so on. Another dharma will be switching on and setting up the videophone equipment at O's end, and another dharma will be doing the same thing at S's end, at $S\text{-}O_a$'s prompting. Further dharmas will let both subscribers know that the call is active. $S\text{-}O_a$ will extinguish itself to let other dharmas operate and monitor the parameters of the call (such as duration, data transmitted, latency, etc.) and charge for it.

This example illustrates that dharmas are ephemeral cybernetic entities. They are inherently non-local, but their actual existence and nature are particular to specific situations, time and places. In the above example, simultaneously with both S and O creating and dissolving dharmas, whole series of other dharmas may arise corresponding to other activities such as monitoring and managing their respective patches, enabling other through traffic, billing the relevant subscribers for those other activities, and similar.

According to the above example, it can also be seen that, beside their other advantages, dharmas provide extremely flexible means of monitoring and allocating system resources, for example bandwidth, monitoring use of the system, recording costs and other data relevant to billing users of the system as well as delivering telhex based services, in a non-hierarchical distributed way that is self-adaptive to changing circumstances and has inherently very short response times (essentially that of the CPU installed in each minder).

By extension, it can also be seen that the same generic process of dharma creation and extinguishing can involve more than two minders, with intermediary minders $M_n$, between S and O, being involved in establishing the links and effecting the communications. In this latter case, while drawn from the same lexicon of algorithms, the dharmas created to involve S, $M_n$, O, would be very different from that of the simple S-O link. Dharmas, thus mediate the local and non-local aspects of net operation up to the whole of IndraNet, including all aspects of distributed non-hierarchical resource allocation across the whole net and net monitoring functions.

If, for example, S and O were not in the vicinity of each other, dharmas initiated originally from S would have interacted with other minders and/or metaminders in S's vicinity and environ to create strings of further dharmas that would eventually coalesce into one dharma linking S and O through a series of intermediary $M_n$ minders. Let's call $\{S, M_n, O\}_l$ this new dharma. $\{S, M_n, O\}_l$ will exist for the whole duration of the link but may involve the transient co-operation of minders on parallel segments of the overall path. In other words, the nature of $\{S, M_n, O\}_l$ will vary throughout the communication, with each $M_n$ minder between S and O taking part in the transfer of only some data packets depending on traffic conditions, priorities and minders' resource availability's at each moment in time. Dharmas like $\{S, M_n, O\}_l$ have thus a multigraph nature.

A key aspect of the present invention is the existence of emergent capabilities and functionality. Emergent features, in the present context, are capabilities and functionality derived or arising from the nature and operation of the IndraNet itself. As will be appreciated from the discussion above, emergent features are not the direct product of individual interactions between elements governed by rules between those logical elements. Rather an emergent feature is one which spontaneously 'arises' out of the global co-operation between the elements of the logical space (cyberspace of IndraNet) and/or the physical network itself. An analogy may be found in the context of physics whereby the characteristics of the space-time locale, which govern the behaviour of physical elements of that locale, are effected by the combined existence of physical features in the locale and elsewhere, where such effects arise globally and non-locally.

The emergent features of the present invention correspond to the inherent behaviour observed in the operation of the IndraNet, this behaviour being derived from non-local, distributed effects arising from dharmas creating, coalescing and being destroyed. These emergent features, in particular with respect to the evolution of distributed and self-sustaining forms of cognition and intelligence, are considered an integral part of the invention. This is more specifically the case with particular applications and embodiments whereby an IndraNet is self sufficient in energy such as, for example, by means of photovoltaic solar cells and suitable energy storage, and thus functions as a non-biological intelligent symbiont in close interaction with human agencies and individuals.

In the above context, it will be appreciated that, while dharmas are related to Distributed Artificial Intelligence (DAI), they are distinct from it. This is exemplified by known techniques whereby DAI makes use of pre-existing "agents". In contrast IndraNet ceaselessly creates and dissolves dharmas.

Some networked multi-processor systems make use of various methods for load distribution across nodes of their network through task/thread models. However, such threaded tasks are different from dharmas. They are more analogous to the basic algorithms used to create dharmas. While addressing some of the same issues, such techniques focus essentially on load allocation algorithms that move threads across processing units for the purpose of optimising or at least improving the overall computing performance of the network. Further, such methods are not concerned with forms of co-operation between nodes by creation of virtual transient entities for the different purpose of mediating between local and non-local activities and operations.

Of course, while any suitable algorithm operating and processing in a digital mode can be used to implement dharmas, this type of implementation does not limit the capability of the IndraNet approach. Non digital or partly digital machines could be used, thus considerably enhancing the potential of the approach.

Details of the IndraNet implementation, such as addressing and construction of the minder hardware are considered to be within the ambit of one skilled in the art and will not be discussed in detail.

Thus the present invention provides an integrated networked system, such as may be used for telecommunications or other network purposes, which operates according to an adaptive and innovative communication methodology. The invention does not rely on or implement hierarchical structures or tree-like state-of-the-art network models, such models not being a true reflection of the character of human interactions. Further, the network according to the invention is expandable, practically without limitation, and may be implemented in a cost and infrastructure effective manner.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope of the appended claims.

What is claimed is:

1. An autopoietic networked communication, control and network and/or environmental management system, comprising:
    a plurality of cybernetic devices, each device adapted to communicate with other cybernetic devices in a networked system;
    processing means located on selected devices for controlling said devices, the operation of the processing means is governed by a library of algorithms which includes a plurality of algorithms defining predetermined functions which mediate local and remote activities of the networked system wherein the library of algorithms is stored in media readable by the processing means included within selected devices in the networked system and distributed according to the functional requirements of at least part of the networked system;
    a plurality of sensing means adapted to sense parameters related to an environment in which the activities occur and output environmental data representative of the environment to corresponding devices, wherein the processing means is programmed to control the activities of the networked system through selection and execution of said algorithms and wherein the selection process occurs in a hermeneutic fashion according to iterative heuristic sequences which are dependent on said environmental data and wherein the result of the selection is dependent on satisfaction of set criteria.

2. A networked system as claimed in claim 1, wherein the cybernetic devices are adapted to operate in relation to a group of cybernetic devices with which they are associated in conjunction with facilitating communications from and to other cybernetic devices.

3. A networked system as claimed in claim 1, further comprising:
    at least one supervisory cybernetic device having higher processing abilities than at least one supervised cybernetic device located within a group of cybernetic devices with which the supervisory cybernetic device is adapted to communicate with in use, wherein the library of algorithms includes algorithms to cause any of the supervised cybernetic devices to request the use of processing abilities from the supervisory cybernetic device when the activities of the network require the supervised cybernetic device to perform processing abilities beyond its capabilities to perform within the criteria in one of isolation and in conjunction with other supervised cybernetic devices with which it is in communication.

4. A networked system as claimed in claim 3, wherein at least selected cybernetic devices are adapted to supervise at least one of implements, machines, systems, animals, and persons.

5. A networked system as claimed in claim 1, wherein the heuristic sequences include a process of selecting environmental data as being relevant for specific activities by reference to corresponding set criteria, the criteria being governed by an iterative selection process that satisfies the set criteria.

6. A networked system as claimed in claim 1, wherein selected processing means control the activities of the network using a stochastic process model to induce variations in the activities and the operation of the system is experiential, storing variations of activities that best satisfy the set criteria for future reference.

7. A networked system as claimed in claim 1, wherein topology of the network of devices is self similar at at least some levels of aggregation at which the system is considered, so that the system displays fractal characteristics for being structured as a network of networks that individually display self similar characteristics.

8. A networked system as claimed in claim 1, wherein the processing means is programmed to integrate environmental data obtained from at least one sensing means to create integrated data and wherein the selection process is at least partly dependent on the integrated data.

9. A networked system as claimed in claim 1, wherein the system adapts to changes in its environment in a manner that is proscriptive and specifies non-allowed behavior of the system, thereby allowing the system to behave in any manner that is not proscribed.

10. A networked system as claimed in claim 1, further comprising:
    communication means for communication between said cybernetic devices, said communication means includes wireless network hardware.

11. An autopoietic network communication, control, and network and/or environmental management system comprising:
    a plurality of cybernetic devices, wherein topology of the network is fractal in nature.

12. An autopoietic network system as claimed in claim 11, wherein:
   the cybernetic devices are adapted to function as both infrastructure of the network itself and means by which network services are delivered to network users;
   the cybernetic devices are further adapted to communicate with other cybernetic devices so that the network is in the form of a fractal and at least partially non-hierarchical mesh; and
   the mesh having a structure, at a specified degree of aggregation, which is substantially similar to that at any other degree of aggregation at which the fractal mesh is considered.

13. An autopoietic network system as claimed in claim 11, wherein the cybernetic devices are adapted to operate in relation to a group of cybernetic devices with which they are associated, in conjunction with facilitating communications from and to other cybernetic devices.

14. An autopoietic network system as claimed in claim 11, wherein selected cybernetic devices are adapted to supervise at least one of the plurality of cybernetic devices functioning at a lower level of aggregation and wherein the supervised cybernetic device is functionally clustered.

15. An autopoietic network system as claimed in claim 11, wherein:
   at each level of aggregation, member sub-networks within the fractal topology display operational closure in relation to other member sub-networks;
   the mode of operation of selected cybernetic devices within each sub-network is primarily that of distributed non-symbolic forms of processing;
   interactions between member sub-networks occur though symbolic information exchange and processing; and
   the sub-networks themselves display operation closure in relation to their environments.

16. An autopoietic network system as claimed in claim 15, wherein at all the levels of aggregation, the autopoietic system displays a dual structure with at least some of its internal organization being intimately related to local activities through local apparati, whilst the overall system is non-local in its logic of operation.

17. A cybernetic device adapted to communicate with other devices through at least one communication channel in an autopoietic networked communication, control, and network and/or environmental management system, the cybernetic device comprising:
   processing means for controlling the cybernetic device, the operation of the processing means governed by a library of algorithms which includes a plurality of algorithms and instructions for at least one of reconfigurable and programmable hardware elements, said algorithms and instructions defining predetermined functions which mediate local and remote activities of the networked system wherein the processing means is programmed to control the activities of the device through selection and execution of said algorithms and wherein the selection process is executed in a hermeneutic fashion according to iterative heuristic sequences which are dependent on environmental data supplied to the device and wherein the result of the selection is dependent on satisfaction of set criteria.

18. A cybernetic device as claimed in claim 17, wherein the library of algorithms is stored in media that is readable and executable by the processing means to govern its operation, the media located within on of the cybernetic device, another cybernetic device, and another cybernetic device in communication with the cybernetic device through the networked system.

19. A cybernetic device as claimed in claim 17, wherein the cybernetic device is structurally coupled with its environment through hermeneutic processes wherein the cybernetic devices is not based on, and does not rely on a priori representations of its environment and itself including representations made by users and designers of the system about the state and nature of the system and its environment.

20. A cybernetic device as claimed in claim 17, wherein the cybernetic device is adapted to communicate with other cybernetic devices through electronic circuits that include at least one programmable element.

21. A cybernetic device as claimed in claim 20, wherein the at least one programmable element is adapted to produce as an output an intermediate frequency for wireless communication, wherein the choice of the intermediate frequency is determined by an evolution scheme governed by specific activities of the cybernetic device as part of the networked system.

22. A cybernetic device as claimed in claim 17, wherein the processing means incorporates electronic circuits which include at least one programmable element.

23. A cybernetic device as claimed in claim 20, 21 or 22, wherein the at least one programmable element includes a field programmable device.

24. A cybernetic device as claimed in claim 17, further comprising:
   memory means; and
   location determination means.

25. A cybernetic device as claimed in claim 17, further comprising:
   output means for controlling the operation of at least one cybernetic device; and
   input means for receiving instructions from the at least one cybernetic device.

26. A cybernetic device as claimed in claim 17, wherein the cybernetic device is connected to at least one ancillary device which includes one of a network computer, an inertial guidance device, and a non-GPS based guidance device.

27. A cybernetic device as claimed in claim 17, wherein the processing means is programming using an evolution scheme which emulates Darwinian evolution by generating large numbers of solutions covering a plurality of possibilities within preset specifications relating to the environmental functionality of the cybernetic device and then selecting an optimal solution to serve as a seed parameter for subsequent iterations wherein the selection process is continued until a required outcome has been achieved relative to set operating criteria.

28. A cybernetic device as claimed in claim 21, wherein the programming by the processing means includes variations on one of simulated annealing procedures and stochastic ensemble procedures.

29. A cybernetic device as claimed in claim 21, wherein the evolution scheme is one of a first type and a second type, the first type selects a suitable modulation scheme and evolves an implementation wherein the transmitter and receiver designs are evolved separately, and the second type specifies a communication link model and evolves a transceiver design that satisfies design constraints of the model.

30. A cybernetic device as claimed in claim 21, wherein the first type of evolution scheme includes the use of a digital intermediate frequency.

31. A cybernetic device as claimed in claim 27, 29, or 30, wherein the evolution scheme operates within design constraints including regulatory constraints including the bandwidth for a link that is required for specific applications.

32. A cybernetic device as claimed in claim 27, wherein the evolution scheme further evolves a modulation scheme.

33. A cybernetic device as claimed in claim 27, wherein the evolution scheme proceeds by a series of steps which are implemented by interactive means including one of genetic algorithms, simulated annealing algorithms, and back-propagation of errors.

34. A cybernetic device as claimed in claim 33, wherein the genetic algorithms are of a class known as minimization algorithms and require a cost function and error metric to minimize wherein suitable cost functions include at least a bit error rate, consideration of out of bandwidth spectral components, and speed of transmission.

35. A cybernetic device as claimed in claim 27, wherein the system is left free to evolve compression algorithms.

36. A cybernetic device as claimed in claim 17, wherein the predetermined functions include provision of communications for data, voice, videophony, video-on-demand, entertainment, security, educational services, health-care services, premises management, energy supply trading and management, banking and electronic commerce.

37. A method of operating a cybernetic device within a networked system, the cybernetic device including a processing means, the method including the steps of:

providing a library of algorithms for controlling the cybernetic device which includes a plurality of instructions defining predetermined functions which mediate local and remote activities of the networked system wherein the library of algorithms is stored in computer media which is readable by the processing means; and programming the processing means to control the activities of the device through selection and execution of the instructions and wherein the selection process is executed in a hermeneutic fashion according to iterative heuristic sequences which are dependent on environmental data supplied to the device and wherein the result of the selection is dependent on satisfaction of set criteria.

38. A method of operating a cybernetic device as claimed in claim 37, wherein the networked system includes a plurality of cybernetic devices, the method further including the step of causing the cybernetic device to communicate with the networked system wherein the processing means executes instructions within the library of algorithms which cause the cybernetic device to operate through co-operative interactions with the plurality of cybernetic devices within the networked system, co-operative interactions being defined as components of the networked system working together to carry out tasks without the interactions themselves being governed by hierarchical structure.

39. A method of operating a cybernetic device as claimed in claim 37, further including the step of providing a memory means and executing instructions in the processing means to cause the cybernetic device to retain in the memory means at least one result of the selection process that satisfies the set criteria and make the instructions available for future use by one of a plurality of cybernetic devices within the networked system.

40. A method of operating a cybernetic device as claimed in claim 39, further including the step of varying the operations of the cybernetic device using a stochastic process wherein the cybernetic device develops and evolves by selecting and retaining variations that better satisfy the set of criteria.

41. A method of operating a cybernetic device as claimed in claim 40 wherein the operation of the device is dependent on the result that best satisfies the set criteria as determined in co-operation with at least one of the plurality of cybernetic devices within the networked system, whereby the cybernetic device evolves in a co-dependent manner with at least one of the plurality of cybernetic devices.

42. A method of operating a cybernetic device as claimed in claim 37 wherein the instructions are developed and selected through proscriptive logic and methods of evolutive satisfaction.

43. A method of operating a cybernetic device as claimed in claim 37, further including the step of causing at least one of the cybernetic devices and the plurality of cybernetic devices to communicate with a network environment and providing instructions within the library of algorithms that cause the at least one of the cybernetic devices and the plurality of cybernetic devices to create transitory distributed software entities that reflect one of a state of the network environment at various levels of network aggregation and activities to which the network is to be put.

44. A method of operating a cybernetic device as claimed in claim 43 wherein said software entities are aggregated from selected instructions through an operational syntax that enable heuristic and hermeneutic sequences, structural coupling, operational closure, required network functionality and methods of proscriptive logic and evolutive satisfaction.

45. A method of operating a cybernetic device as claimed in claim 44 wherein the syntax corresponds to a set of logical rules that governs the gathering and aggregation of instructions to create transitory software entities and that translate, in any computer language capable of implementing the heuristic and hermeneutic sequences in local and remote manner, the logical operations of the network.

46. A method of operating a cybernetic device as claimed in claim 43 wherein the transitory software entities include instructions to selectively utilize resources of selected cybernetic devices in the networked system to achieve a required result through the co-operation amongst member components of the networked system at least one of such member components being cybernetic devices and related network software and networks of transitory software entities.

47. A method of operating a cybernetic device as claimed in claim 43 wherein the transitory software entities operate through heuristic hermeneutic sequences.

48. A method of operating a cybernetic device as claimed in claim 43 wherein the transitory software entities are designed to achieve operational closure of member networks and overall network, structural coupling of the member networks and overall network with their respective environments, co-operation among member networks and mediation between local and remote activities, including communications and other network functionality, through layered functionality.

49. A method of operating a cybernetic device as claimed in claim 43 wherein the transitory software entities are adapted to evolve through proscriptive logic and method of evolutive satisfaction.

50. A method of operating a cybernetic device as claimed in claim 43 wherein the cybernetic device is adapted to cause the network to operate by means of transitory software entities that are created as a result of requesting the network to perform any task, whereby the transitory software entities are comprised of groups of basic operational instructions and are evolutively created by prior such software entities from an original set of the operational instructions.

* * * * *